(12) United States Patent
Sato et al.

(10) Patent No.: US 11,307,789 B2
(45) Date of Patent: *Apr. 19, 2022

(54) STORAGE SYSTEM AND STORAGE CONTROL METHOD

(71) Applicant: Hitachi, Ltd., Tokyo (JP)

(72) Inventors: Kenta Sato, Tokyo (JP); Akira Deguchi, Tokyo (JP); Tomohiro Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,733

(22) Filed: Sep. 1, 2020

(65) Prior Publication Data

US 2020/0393987 A1 Dec. 17, 2020

Related U.S. Application Data

(63) Continuation of application No. 16/293,711, filed on Mar. 6, 2019, now Pat. No. 10,776,035.

(30) Foreign Application Priority Data

Sep. 21, 2018 (JP) .................................. 2018-177578

(51) Int. Cl.
  *G06F 12/00* (2006.01)
  *G06F 3/06* (2006.01)
  *G06F 11/20* (2006.01)
  *H04L 67/1097* (2022.01)

(52) U.S. Cl.
  CPC .......... *G06F 3/0647* (2013.01); *G06F 3/0604* (2013.01); *G06F 3/067* (2013.01); *G06F 3/0634* (2013.01); *G06F 3/0658* (2013.01); *G06F 11/203* (2013.01); *H04L 67/1097* (2013.01)

(58) Field of Classification Search
  CPC .... G06F 3/0647; G06F 3/0604; G06F 3/0634; G06F 3/0658; G06F 3/067; G06F 3/0683; G06F 3/0689; G06F 11/203; G06F 11/1446; G06F 11/1456; G06F 11/1458; H04L 67/1097
  See application file for complete search history.

(56) References Cited

U.S. PATENT DOCUMENTS

2018/0024964 A1 * 1/2018 Mao ...................... G06F 1/3268
  711/173

FOREIGN PATENT DOCUMENTS

JP 2014-075027 A 4/2014

* cited by examiner

*Primary Examiner* — Shawn X Gu
(74) *Attorney, Agent, or Firm* — Mattingly & Malur, PC

(57) ABSTRACT

A storage system and storage control method are provided in which a plurality of volumes to be processed by a storage control unit are distributed and evacuated in a normal storage control unit without recovering redundancy of the storage control unit having decreased redundancy, and the storage control unit itself having the decreased redundancy is deleted after the evacuating is completed, and thus reservation information processing resources for guaranteeing recoverability of the redundancy become unnecessary.

14 Claims, 11 Drawing Sheets

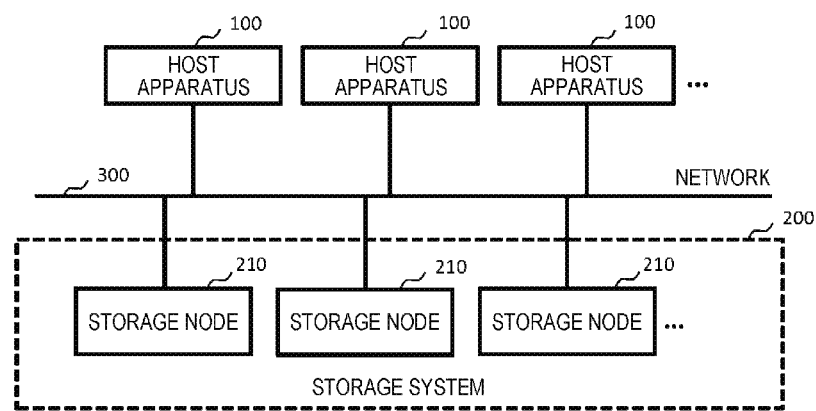
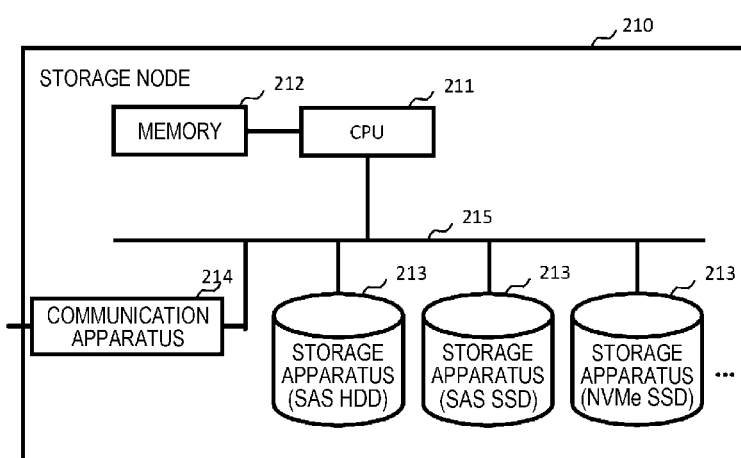

FIG. 5

STORAGE NODE MANAGEMENT TABLE 256

| STORAGE NODE ID 2561 | ROLE 2562 | OPERATION STATUS 2563 | CPU CORE NUMBER 2564 | MEMORY AMOUNT 2565 | COMMUNICATION BAND UTILIZATION RATE 2566 | TOTAL STORAGE APPARATUS CAPACITY 2567 | TOTAL STORAGE APPARATUS USAGE 2568 |
|---|---|---|---|---|---|---|---|
| 0 | WORKER | FAILURE | 20 | 96GB | NA | 10TB | NA |
| 1 | MASTER | NORMAL | 20 | 96GB | 70% | 10TB | 3TB |
| 2 | WORKER | NORMAL | 20 | 96GB | 40% | 15TB | 2TB |
| 3 | WORKER | NORMAL | 20 | 96GB | 30% | 15TB | 2TB |
| ... | ... | ... | ... | ... | ... | ... | ... |

FIG. 6

STORAGE CONTROL UNIT MANAGEMENT TABLE 257

| STORAGE CONTROL UNIT ID 2571 | STORAGE CONTROL UNIT PAIR ID 2572 | STORAGE NODE ID 2573 | OPERATION MODE 2574 | ASSIGNED CPU CORE NUMBER 2575 | ASSIGNED MEMORY AMOUNT 2576 | CPU UTILIZATION RATE 2577 | MEMORY USAGE 2578 |
|---|---|---|---|---|---|---|---|
| 0 | 0 | 0 | ACTIVE | 8 | 30GB | NA | NA |
| 1 | 0 | 1 | STANDBY | 4 | 30GB | 30% | 23GB |
| 2 | 1 | 1 | ACTIVE | 8 | 30GB | 50% | 28GB |
| 3 | 1 | 2 | STANDBY | 4 | 30GB | 40% | 25GB |
| 4 | 2 | 2 | ACTIVE | 8 | 30GB | 30% | 24GB |
| 5 | 2 | 3 | STANDBY | 4 | 30GB | 40% | 25GB |
| 6 | 3 | 3 | ACTIVE | 8 | 30GB | 30% | 28GB |
| ... | ... | ... | ... | ... | ... | ... | ... |
| 21 | 10 | 0 | STANDBY | 4 | 30 | NA | NA |

FIG. 7
VOLUME MANAGEMENT TABLE 261

| VOLUME ID | CAPACITY | USED CAPACITY | STORAGE CONTROL UNIT PAIR ID | BLOCK ID | LOGICAL CHUNK ID | WRITE AMOUNT |
|---|---|---|---|---|---|---|
| 0 | 200GB | 50GB | 0 | 0 | 0 | 100MB |
| | | | | 4 | 10 | |
| | | | | ... | ... | |
| 1 | 300GB | 80GB | 0 | 0 | 1 | 300MB |
| | | | | 10 | 25 | |
| | | | | ... | ... | |
| ... | ... | ... | ... | ... | ... | |

FIG. 8
LOGICAL CHUNK MANAGEMENT TABLE 271

| LOGICAL CHUNK ID | STORAGE CONTROL UNIT PAIR ID | STORAGE NODE ID (MASTER) | PHYSICAL CHUNK ID (MASTER) | STORAGE NODE ID (MIRROR) | PHYSICAL CHUNK ID (MIRROR) |
|---|---|---|---|---|---|
| 0 | 0 | 0 | 0 | 1 | 1 |
| 1 | 0 | 0 | 2 | 1 | 5 |
| ... | ... | ... | ... | ... | ... |
| 0 | 1 | 1 | 1 | 2 | 0 |
| 1 | 1 | 1 | 3 | 2 | 4 |
| ... | ... | ... | ... | ... | ... |

PHYSICAL CHUNK MANAGEMENT TABLE  272

| PHYSICAL CHUNK ID (2721) | STORAGE APPARATUS ID (2722) | OFFSET IN STORAGE APPARATUS (2723) |
|---|---|---|
| 0 | 0 | 0x0000 |
| 1 | 0 | 0x1000 |
| 2 | 1 | 0x0000 |
| 3 | 1 | 0x1000 |
| ... | ... | ... |

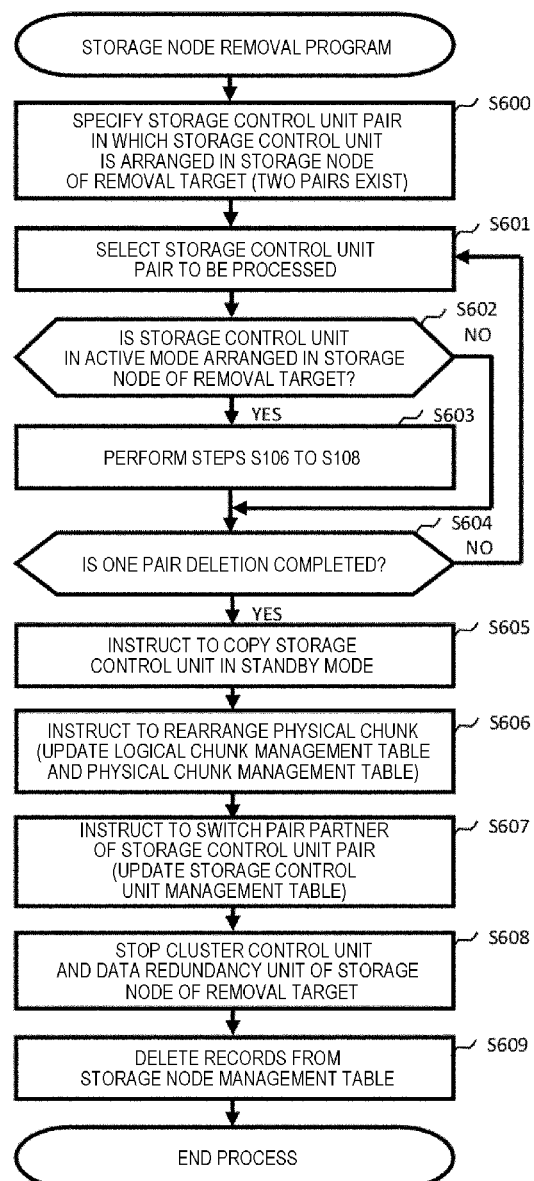

STORAGE SYSTEM AND STORAGE CONTROL METHOD

CROSS-REFERENCE TO RELATED APPLICATION

The present application claims priority from Japanese application JP 2018-177578, filed on Sep. 21, 2018, the contents of which is hereby incorporated by reference into this application.

BACKGROUND OF THE INVENTION

1. Field of the Invention

The present invention relates to a storage system and a control method thereof.

2. Description of Related Art

In an information processing system that requires high reliability, it is common to use a plurality of servers and redundantize a system. However, in such a redundant configuration, it is necessary to prepare a spare server that replaces a server having an error, so as to recover redundancy after server failure. Ordinarily, a use efficiency of the servers is reduced since the spare server does not perform a process.

Meanwhile, recently, by virtualizing servers using a virtualization technology, configurations for improving a use efficiency of physical servers and reducing the number of physical servers have increased. The invention related to redundancy of a virtual machine is disclosed in, for example, JP-A-2014-75027. JP-A-2014-75027 discloses a technology of arranging a plurality of active virtual machines and preliminary virtual machines provided to redundantize the active virtual machines on separate physical servers. According to such a technology of arranging virtual machines, when one of redundantized virtual machines is lost due to physical server failure, it is possible to recover redundancy without having to prepare a spare physical server, by copying the lost virtual machine on another physical sever and reconstructing a redundant configuration.

Among information processing systems that require high reliability, for example, there may be an information processing system that requires a certain amount of information processing resources, such as a CPU core, a memory, and the like, regardless of an information amount processed by a system, so as to stably operate a basic process in the system, such as an operation base for executing a redundancy operation. For example, in order for a storage system using a virtualization technology to stably operate, a certain amount of information processing resources is required regardless of a volume number or the like.

When a system that requires at least such a certain amount of information processing resources is operated in a configuration in which a plurality of independent systems are operated on one server via a virtual machine, a container, a multi-process, and the like, it is necessary that the system is not affected by another system operating on the same server. Accordingly, it is usual to reserve information processing resources necessary for the system and fixedly assign the information processing resources to the system.

However, when the arranging technology of JP-A-2014-75027 is applied to such a system, it is necessary for the system with reduced redundancy to have the minimum information processing resources required by the system to be remained in physical server of a reconstruction destination. Thus, in order to reliably recover the redundancy, it is necessary to pre-reserve the information processing resources for redundancy recovery in the physical server. Since the information processing resources reserved for the redundancy recovery are not used unless the redundancy is degraded due to failure or the like, use efficiency of the physical server is decreased and system construction costs are increased.

Further, software defined storage (SDS) that is a storage system using virtualization technology requires high reliability while it is required to build an information processing system at low cost by using a relatively inexpensive server.

SUMMARY OF THE INVENTION

The invention is to provide a low cost storage system and a storage control method while ensuring availability of a system.

According to an aspect of the invention, there is provided a storage system including a plurality of storage nodes constituting a cluster, wherein each of the plurality of storage nodes includes a storage apparatus storing data, a cluster control unit controlling the entire storage system, and a storage control unit providing a storage area in units of volume to a host apparatus by using the storage apparatus and storing data in the storage apparatus in response to an input and output (IO) request from the host apparatus, the storage control unit is configured to constitute a storage control unit group with a storage control unit of another storage node in the cluster, wherein one storage control unit of the storage control unit group processes the IO request from the host apparatus as a storage control unit in an active mode and the remaining storage control unit of the storage control unit group, as a storage control unit in a standby mode, takes over processes of the storage control unit in the active mode by switching to an active mode when the storage control unit in the active mode is lost, and when one storage node among the plurality of storage nodes is removed from the storage system, a cluster control unit of a remaining other storage node obtains information about a plurality of volumes handled by a storage control unit group constituted by using a storage control unit of the removed storage node, determines a storage control unit group of an evacuating destination with respect to each volume of the plurality of volumes about which the information is obtained, and distributes and evacuates the plurality of volumes handled by the storage control unit group constituted by using the storage control unit of the removed storage node from a storage control unit constituting the storage control unit group constituted by using the storage control unit of the removed storage node to a storage control unit of a plurality of storage control unit groups of the evacuating destination.

According to the invention, reservation information processing resources for guaranteeing the recoverability of redundancy are not required and thus a use efficiency of a physical server is improved.

BRIEF DESCRIPTION OF THE DRAWINGS

FIG. 1 is a block diagram of an overall configuration of an information processing system, according to a first embodiment;

FIG. 2 is a block diagram of a detailed configuration of a storage node;

FIG. 5 is a diagram illustrating an example of a storage node management table;

FIG. 6 is a diagram illustrating an example of a storage control unit management table;

FIG. 7 is a diagram illustrating an example of a volume management table;

FIG. 8 is a diagram illustrating an example of a logical chunk management table;

FIG. 17 is a diagram illustrating an example of processes of a storage node removal program (1).

DESCRIPTION OF EMBODIMENTS

Figure 3:
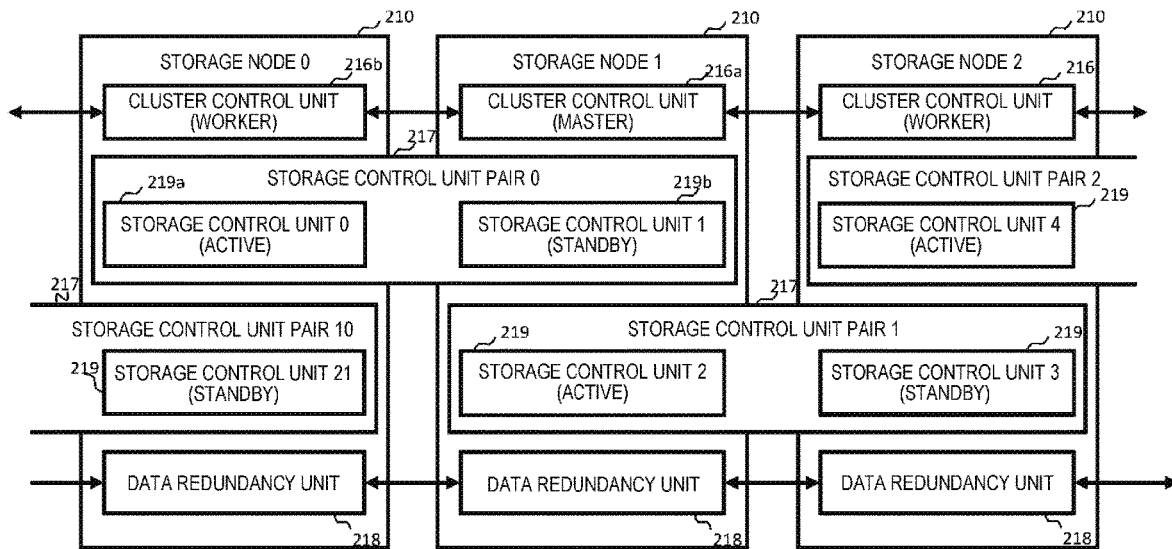
FIG. 3 is a diagram illustrating a logical configuration of a storage system, according to the first embodiment.

Hereinafter, embodiments of the invention will be described with reference to the drawings. However, the following descriptions and drawings are examples for describing the invention and are suitably omitted and simplified for clarity of description, and thus do not limit the technical ranges of the invention.

In the following description, various types of information are described by expressions such as a "table", "list", "queue", and the like, but such various types of information may be represented by a data structure other than the above. In this regard, in order to indicate that the various types of information do not depend on the data structure, the various types of information may be simply referred to as "information". While describing the various types of information, expressions such as "identification information", "identifier", "designation", "name", "ID", "number", and the like, are used, and such expressions may replace each other.

In the following description, a "program" may be described as the subject, but a processor may be described as the subject such that processes determined when the program is executed by the processor (for example, a central processing unit (CPU) or a graphics processing unit (GPU)) are performed while suitably using memory resources (for example, a memory), an interface device (for example, a communication apparatus), or the like. Similarly, the subject of processes implementing and executing the program may be, for example, a controller, an apparatus, a system, a calculator, a node, a storage apparatus, a server, a client, or a host included in the processor. Also, some or entire program may be processed using a hardware circuit.

Various programs may be installed in each calculator by a program distribution server or a storage medium. In the following description, two or more programs may be implemented as one program or on the contrary, one program may be implemented as two or more programs.

First Embodiment

Hereinafter, a first embodiment will be described with reference to FIGS. 1 to 16.

FIG. 1 is a diagram illustrating a physical configuration of an information processing system, according to the first embodiment. The information processing system includes one or more host apparatuses 100, one or more management terminals 110, and a storage system 200 of a multi-node configuration including two or more storage nodes 210. Each host apparatus 100 and management terminal 110, and each storage node 210 are connected via a network 300 including, for example, a fibre channel, Ethernet (registered trademark), wireless local area network (LAN), InfiniBand, or the like. Although not illustrated, the network 300 may include various relay apparatuses, such as a network switch and a gateway. Also, a dedicated network may be separately provided between each storage node 210, and each host apparatus 100 and management terminal 110, and each storage node 210 may be connected via a network other than the dedicated network.

The host apparatus 100 is a server apparatus for performing various job processes by executing an installed application program. The host apparatus 100 transmits a data read request or write request to the storage node 210 via the network 300, in response to a request from the application program being executed. The host apparatus 100 may be a virtual server apparatus, such as a virtual machine or a container.

The management terminal 110 is a client apparatus for a storage system administrator to perform various setting operations or status monitoring on the storage system 200. The management terminal 110 may be a mobile terminal, such as a smart phone or a tablet terminal, or a part of the host apparatus 100 may also serve as a management terminal.

The storage system 200 is a server apparatus providing a storage area for reading and writing data with respect to the host apparatus 100. Also, the storage node 210 constituting the storage system 200 may be a virtual server apparatus, such as a virtual machine or a container, wherein a virtual server apparatus of the host apparatus 100 and a virtual server apparatus of the storage node 210 may be arranged in the same physical server apparatus.

FIG. 2 is a diagram illustrating a detailed configuration of the storage node 210. The storage node 210 includes a CPU 211, a memory 212, a storage apparatus 213, and a communication apparatus 214, which are configured by a server apparatus connected via an internal network 215. However, FIG. 2 illustrates an example of a storage node and the invention is not limited by the illustrated configuration, and thus all or one of the CPU 211, memory 212, storage apparatus 213, and communication apparatus 214 may be plural.

The CPU 211 is a control apparatus controlling overall operations of the storage node 210, and executes various processes by executing various programs stored in the memory 212. The memory 212 stores, for example, control information used by the storage node 210, a program executed by the CPU 211, data accessed by a host apparatus, and the like. The memory 212 generally includes a dynamic random access memory (DRAM), but may include a storage medium other than DRAM, for example, a magnetoresistive RAM (MRAM), a resistive RAM (ReRAM), a phase change memory (PCM), NAND, or the like.

The storage apparatus 213 is an apparatus including a physical storage area, and for example, may include a non-volatile storage apparatus, such as a hard disk drive (HDD), a solid state drive (SSD), a storage class memory (SCM), an optical disk, or the like. Serial attached SCSI (SAS) and non-volatile memory express (NVMe) are described as interfaces for accessing the storage apparatus 213, but other interfaces may be used, such as serial ATA (SATA), universal serial bus (USB), and the like.

Generally, a storage system of a multi-node configuration protects data by storing a copy of data in the other storage node 210 in preparation for a node failure. A plurality of storage apparatuses 213 may be gathered in a node and a high reliability technology such as redundant arrays of independent disks (RAID) may be used.

The communication apparatus 214 is connected to the host apparatus 100 or the other storage node 210, the management terminal 110 for managing the storage system 200, and the like via the network 300 to relay communication between the host apparatus 100, the management terminal 110, and the other storage node 210. In FIG. 2, the communication apparatus 214 is shared by communication for the host apparatus 100, communication for the management terminal 110, and communication for the other storage node 210, but different communication apparatuses may be provided for the communications.

FIG. 3 is a diagram illustrating a logical configuration of a storage system according to the first embodiment. A cluster control unit 216 is software for controlling the entire storage system including a plurality of storage nodes. The cluster control unit 216 includes two types of operation roles, a master and a worker. A cluster control unit 216b of worker role executes various controls or status monitoring in a storage node according to an instruction of a cluster control unit 216a of master role, and the cluster control unit 216a of master role executes processes that require exclusive control or consistency control of an entire cluster, processes of various setting operations via the management terminal 110, notification of occurrence of failure, and the like. Here, a master may include functions of a worker.

There is always one cluster control unit operating as a master role in a cluster, and other cluster control units operate as worker roles. A cluster control unit of master role and a cluster control unit of worker role perform alive monitoring with each other via communication between storage nodes, or the like. When a cluster control unit is lost due to a storage node failure or the like, the cluster control unit of master role determines that a storage node failure has occurred and performs failure recovery processes. Details about the failure recovery processes will be described later with reference to the drawings.

When the cluster control unit of master role is lost, any one of the cluster control units of worker roles in the cluster is switched to a master role. As to selecting of a cluster control unit to be switched to a master role from among a plurality of cluster control units of worker roles, the technique and function called "leader election" is generally used, and thus details thereof will be omitted.

A storage control unit 219 is realized by software performing various controls related to a volume provided to a host apparatus as a storage area. The storage control unit 219 has functions of providing the storage area to the host apparatus in units of volume by using a storage apparatus and storing data in the storage apparatus in response to an input/output (IO) request from the host apparatus. The storage control unit 219 has a function of migrating a volume handled by a storage control unit to another storage control unit (a migration function).

The storage control unit 219 has two types of operation modes, which are an active mode and a standby mode. A storage control unit 219a in an active mode arranged in a certain storage node operates by configuring a pair (referred to as a storage control unit pair 217) with a storage control unit 219b in a standby mode arranged in another storage node in a cluster. In addition to a storage control unit pair, when a plurality of storage control units in a standby mode are assigned to one storage control unit in an active mode, a storage control unit group is set. In general, the storage control unit 219a in the active mode processes the IO request from the host apparatus. The storage control unit 219b in the standby mode stands by in preparation for a loss of the storage control unit 219a in the active mode caused by a storage node failure or the like. When the storage control unit 219a in the active mode is lost, the storage control unit 219b in the standby mode switches to an active mode to take over processing of the IO request and the like. Here, both of two storage control units constituting a storage control unit pair may operate in an active mode, and two or more storage control units constituting a storage control unit group may operate in an active mode. In this case, additional processes, such as exclusive control, and the like, are required between the storage control units in the active mode. In addition, when the storage control unit in the active mode is lost due to a storage node failure or the like, the remaining storage control unit in the active mode may take over processing of the IO request and the like, which were handled by the lost storage control unit in the active mode.

As illustrated in FIG. 3, two or more storage control units may be arranged in one storage node. Further, when the number of storage control units is equalized in an active mode and in a standby mode arranged in one storage node, a utilization rate of information processing resources, for example, CPU, memory, or the like, may be equalized among storage nodes.

A data redundancy unit 218 is realized by software for preventing a data loss caused by a storage node failure, by redundantizing data among the plurality of storage nodes 210 and storing the data in a storage apparatus. As a method of data redundancy, for example, a method of storing a copy of data in the other storage node 210, a method of distributing and storing parity in the plurality of storage nodes 210, and the like are considered. Although not illustrated, in preparation for a storing apparatus failure in a storage node, data redundancy such as RAID or the like may be performed within a node in addition to data redundancy between storage nodes.

As such, the first embodiment is an application example of a virtualization technology of virtualizing a server, and is related to a storage system using a plurality of physical servers as storage nodes. In such a storage system, active (working system) and standby (backup system) storage control units providing a volume as a storage area to a host apparatus are arranged between different storage nodes and are redundantized. In order to improve a processing performance of the entire storage system, a plurality of storage control unit pairs including active and standby modes are provided in one storage node.

Figure 4:
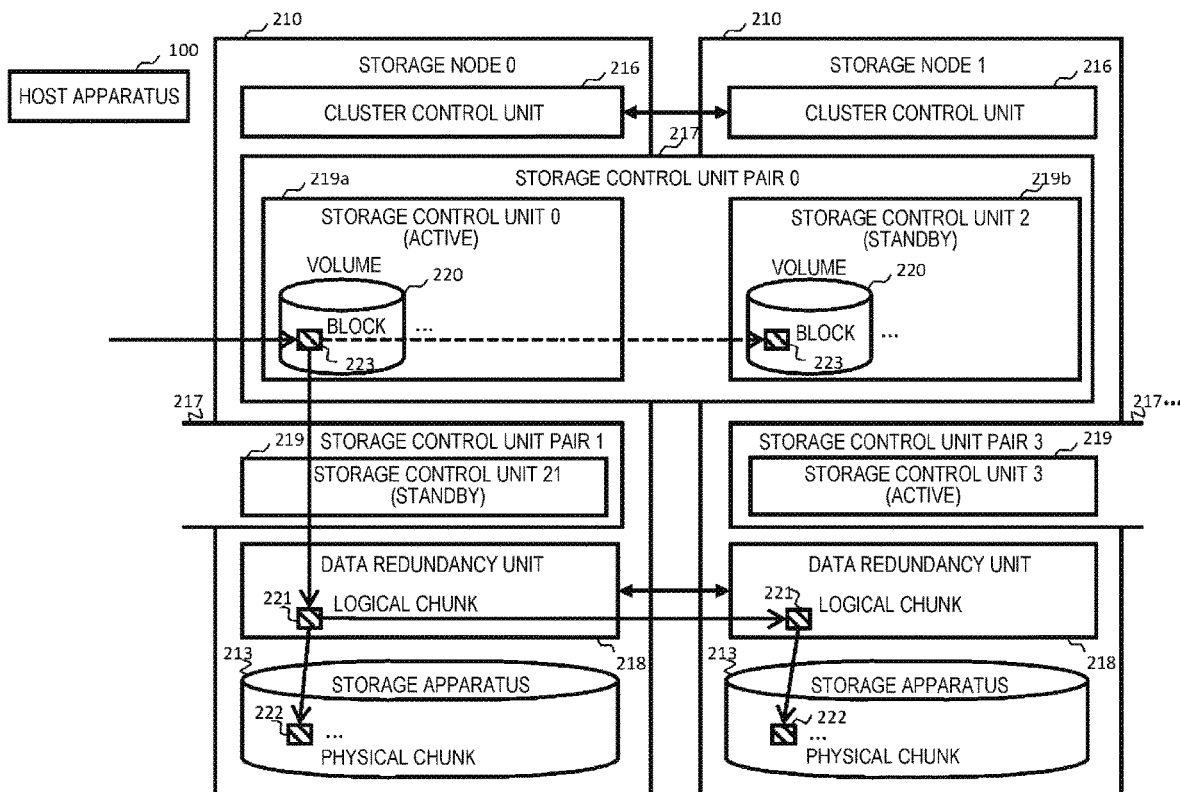
FIG. 4 is a diagram for describing data management according to the first embodiment.

FIG. 4 is a diagram for describing an outline of data management according to the first embodiment. FIG. 4 illustrates a case where a write request from a host apparatus is processed.

The data redundancy unit 218 copies data among a plurality of storage nodes in a layer of a chunk. A physical chunk 222 is a physical storage area created by dividing a storage apparatus in a storage node into one or more small areas of predetermined capacity (for example, 42 MB). A logical chunk 221 is a logical chunk to which one or more physical chunks are assigned. The logical chunk 221 is assigned to a block 223 of a volume 220 described later, and write data of the host apparatus is stored therein. Two or more physical chunks 222 created in different storage nodes respectively are assigned to one logical chunk 221 and data written on the logical chunk 221 is stored in all assigned physical chunks 222 to realize data redundancy between nodes. In FIG. 4, the data is stored in the physical chunk 222 of each storage node 210 in which the storage control units 219 in an active mode and a standby mode are arranged. As such, since the data is stored (ensuring locality of data) in the storage node 210 in which the storage control units 219 in the active mode and the standby mode are arranged, when there is a read request of the data with respect to a storage apparatus providing a volume to a host apparatus, it is not required to read data from another storage node and high responsiveness may be realized.

When locality of data is not ensured, the data may be stored in physical chunks of two arbitrary storage nodes. For example, when a free capacity of a storage apparatus of a storage node where the storage control unit 219 is arranged is insufficient, processes may be performed to store the data in a physical chunk of a storage node where a free capacity of a storage apparatus is sufficient.

The volume 220 is a virtual storage area provided by the storage control unit 219 to the host apparatus 100, and the host apparatus 100 issues a write request of data on a volume. The volume 220 is created by an administrator of the storage system 200 issuing a volume creation instruction with respect to the storage system 200 through the management terminal 110. The storage control unit 219 that is a creation destination of the volume 220 may be designated by the administrator during volume creation, or the cluster control unit 216a of master role that received the volume creation instruction may select the creation destination based on free storage capacity of each storage node, a CPU utilization rate of each storage control unit, or the like.

Since a volume itself does not have a physical storage area, data is logically written on the logical chunk 221 by assigning the logical chunk 221 in response to a write request from the host apparatus 100. The volume 220 is managed by dividing a storage area into one or more blocks 223 having predetermined capacity from the head. Such a block is assigned to, for example, a logical chunk in a one-to-one manner. Immediately after the volume creation, no logical chunk is assigned to any block, and when the host apparatus 100 performs writing of data on the volume 220 but the logical chunk 221 is not assigned to the block 223 corresponding to an area where the data is written, processes of creating the logical chunk 221 and assigning the block 223 and the logical chunk 221 are performed.

Processing of the IO request from the host apparatus 100 is handled by the storage control unit 219a in the active mode. When a new logical chunk is created and a block and the logical chunk are assigned, information indicating a corresponding relationship thereof is transmitted to the storage control unit 219b in the standby mode. The storage control unit 219a in the active mode and the storage control unit 219b in the standby mode constitute one storage control unit pair 217. As illustrated in FIG. 4, the storage control unit 219 in the standby mode of a storage node 0 constitutes the storage control unit pair 217 with a storage control unit of a storage node other than a storage node 1, and the storage control unit 219 in the standby mode of the storage node 1 constitutes the storage control unit pair 217 with a storage control unit of a storage node other than the storage node 0.

Data written on the logical chunk 221 is written on the physical chunk 222 by the data redundancy unit 218 according to the corresponding relationship between the logical chunk 221 and the physical chunk 222. In the example of FIG. 4, data redundancy is performed by coping (duplicating) a physical chunk, and thus the data written from the host apparatus 100 is written on physical chunks of the "storage node 0" and the "storage node 1". Even when a physical chunk is triplicated or redundancy is performed by using RAID or erasure coding between storage nodes, a data redundancy unit copies a physical chunk or generates parity according to a redundancy scheme. In FIG. 4, a block and a logical chunk are assigned in a one-to-one manner with the same capacity, and thus the following description will be provided on the assumption that a block and a logical chunk are assigned in a one-to-one manner. However, for example, two or more blocks including one or more volumes may be assigned to one logical chunk.

Although not illustrated in FIG. 4, since a storage control unit and a data redundancy unit of the "storage node 1" take over processes when the "storage node 0" has a failure, the "storage node 1" also contains information about a volume, information about a block, and information about a logical chunk, and when information is updated in either one of the storage nodes, updated content is transmitted to the other storage node in synchronization and the information is updated. Details about each piece of information will be described by using a drawing in which management information is illustrated.

Next, management information (a management table) for controlling a storage system, according to the first embodiment will be described. Various types of management information may be referred to and set by an administrator of the storage system 200 via the management terminal 110.

FIG. 5 illustrates an example of a storage node management table 256. A storage node management table may be represented in a data structure other than a table form. Accordingly, the storage node management table may be simply referred to as "information" to indicate that the storage node management table does not depend on a data structure. The storage node management table is information for managing an operation status of a storage node, and various information processing resources possessed by a storage node. The storage node management table is stored in a memory of a storage node where a cluster control unit of master role operates. The storage node management table 256 manages records including a storage node ID 2561, a role 2562, an operation status 2563, a CPU core number 2564, a memory amount 2565, a communication band utilization rate 2566, a total storage apparatus capacity 2567, and a total storage apparatus usage 2568.

The storage node ID 2561 is an ID for uniquely identifying a storage node, and is a unique ID throughout a storage system. The role 2562 is information indicating an operation role (a master role or a worker role) of a cluster control unit operating on the corresponding storage node. The operation status 2563 is information indicating whether the corresponding storage node is operating normally. The CPU core number 2564 and the memory amount 2565 are information respectively indicating the number of cores of CPU mounted on the corresponding storage node and the capacity of a memory. The communication band utilization rate 2566 is information indicating a band utilization rate of a communication apparatus mounted on the corresponding storage node. The total storage apparatus capacity 2567 is the total capacity of a storage apparatus mounted on the corresponding storage node. The total storage apparatus usage 2568 is the total capacity actually used from capacity of the storage apparatus mounted on the corresponding storage node. A storage node having a storage node ID of 1 indicates being operated as a cluster control unit of master role.

The communication band utilization rate 2566 and the total storage apparatus usage 2568 are information periodically obtained by a cluster control unit of master role from a cluster control unit of worker role operating in each storage control unit. Although omitted, each storage node manages information of a storage node collected by a cluster control unit of master role. Also, when a cluster control unit of the storage unit does not operate due to a storage node failure or the like, the cluster control unit of master role determines that a failure occurred in the storage node and changes an operation status in a storage node management table to failure. In FIG. 4, a failure occurred in a storage node having a storage node ID of 0. Further, "NA" is indicated where a communication band utilization rate and a total storage apparatus usage were unable to be obtained due to a storage node failure.

FIG. 6 illustrates an example of a storage control unit management table 257. The storage control unit management table 257 may be represented in a data structure other than a table form. Accordingly, the storage control unit management table 257 may be simply referred to as "information" to indicate that the storage control unit management table 257 does not depend on a data structure. The storage control unit management table 257 is information for managing a pair relationship of storage control units, a relationship between a storage control unit and a storage node, and an operation status of a storage control unit. The storage control unit management table 257 is stored in a memory of a storage node where a cluster control unit of master role operates. The storage control unit management table 257 manages records including a storage control unit ID 2571, a storage control unit pair ID 2572, a storage node ID 2573, an operation mode 2574, an assigned CPU core number 2575, an assigned memory amount 2576, a CPU utilization rate 2577, and a memory usage 2578.

The storage control unit ID 2571 is an ID for uniquely identifying a storage control unit and is a unique ID throughout a storage system. The storage control unit pair ID 2572 is an ID for uniquely identifying a storage control unit pair to which the corresponding storage control unit belongs. The storage node ID 2573 is an ID for uniquely identifying ID of a storage node where the corresponding storage control unit is arranged. The operation mode 2574 is information indicating whether an operation mode of the corresponding storage control unit is an active mode or a standby mode.

In FIG. 6, certain amounts of CPU cores and memory are fixedly assigned for each storage control unit, and the assigned CPU core number 2575 and the assigned memory amount 2576 are information respectively indicating the number of CPU cores and a memory amount assigned from the storage node to the corresponding storage control unit. The CPU utilization rate 2577 is information indicating an average value of a utilization rate of each CPU core assigned to the corresponding storage control unit. The memory usage 2578 is information indicating a memory amount actually used from a memory assigned to the corresponding storage control unit.

In FIG. 6, a storage control unit having a storage control unit ID 2571 of "0" operates in an active mode with respect to a storage node having a storage node ID of "0", and constitutes a storage control unit pair having a storage control unit pair ID of "0" with a storage control unit having a storage control unit ID of "1" operating in a standby mode with respect to a storage node having a storage node ID of "1".

The CPU utilization rate 2577 and the memory usage 2578 are information periodically obtained by the cluster control unit 216a of master role from each storage control unit through the cluster control unit 216b of worker role operating in each storage node. In FIG. 6, "NA" is indicated where a cluster control unit of the corresponding storage node is not operated due to a storage node failure or the like.

FIG. 7 illustrates an example of a volume management table 261. The volume management table 261 may be represented in a data structure other than a table form. Accordingly, the volume management table 261 may be simply referred to as "information" to indicate that the volume management table 261 does not depend on a data structure. The volume management table 261 manages a relationship between a volume and a storage control unit pair, a relationship between a logical chunk and a block in a volume, an IO amount per unit time for each volume. The volume management table 261 is stored in a memory of each storage node. The volume management table 261 manages records including a volume ID 2611, capacity 2612, used capacity 2613, a storage control unit pair ID 2614, block ID 2615, a logical chunk ID 2616, and an IO amount 2617. The volume management table 261 may be referred to by a storage control unit.

The volume ID 2611 is an ID for uniquely identifying a volume. The volume is a resource provided to a host apparatus and is a unique ID throughout a storage system. The capacity 2612 is information indicating capacity of the corresponding volume. The used capacity 2613 is information indicating capacity of a physical storage area actually used by the corresponding volume. The used capacity 2613 may be calculated by adding a block size to the number of blocks to which a logical chunk is assigned. The storage control unit pair ID 2614 is an ID for uniquely identifying a storage control unit pair in charge of processing an IO request from the host apparatus to the corresponding volume. The block ID 2615 is block position information from the head of the corresponding volume.

The logical chunk ID 2616 is an ID for uniquely identifying a logical chunk assigned to the corresponding block of the corresponding volume. It is possible to uniquely identify a logical chunk assigned to the corresponding block of the corresponding volume by combining the storage control unit pair ID 2614 and the logical chunk ID 2616. The IO amount 2617 is information indicating an IO amount per unit time for each volume.

In a volume having the volume ID 2611 of "0" in FIG. 7, a storage control unit pair having the storage control unit pair ID 2614 of "0" handles processing of the IO request from the host apparatus, and a logical chunk having the logical chunk ID 2616 of "0" is assigned to a block having the block ID 2615 of "0".

As such, the volume management table 261 assigns and manages each volume and a storage control unit pair. One volume and a storage control unit pair handling the IO request from the host apparatus with respect to the volume are assigned in a one-to-one manner. Storage control units constituting a storage control unit pair are specified by the storage control unit management table of FIG. 6, and among the storage control units constituting the storage control unit pair, a storage control unit in an active mode corresponds to the storage control unit processing the IO request from the host apparatus with respect to the volume.

In FIG. 7, blocks and logical chunks are assigned in an one-to-one manner, but when a logical chunk is divided and a plurality of blocks are assigned to one logical chunk, a column of an ID for identifying the divided logical chunk is added.

FIG. 8 illustrates an example of a logical chunk management table 271. The logical chunk management table 271 may be represented in a data structure other than a table form. Accordingly, the logical chunk management table 271 may be simply referred to as "information" to indicate that the logical chunk management table 271 does not depend on a data structure. The logical chunk management table 271 is information for managing a relationship between a logical chunk and a physical chunk, and a storage control unit pair assigned to a logical chunk. The logical chunk management table 271 is stored in a memory of each storage node. The logical chunk management table 271 manages records including a logical chunk ID 2711, a storage control unit pair ID 2712, a storage node ID (master) 2713, a physical chunk ID (master) 2714, a storage node ID (mirror) 2715, and a physical chunk ID (mirror) 2716. The logical chunk management table 271 may be referred to by the data redundancy unit 218.

The logical chunk ID 2711 is an ID for uniquely identifying a logical chunk. A logical chunk is a resource assigned to a storage control unit pair, and is a unique ID within the storage control unit pair. The storage control unit pair ID 2712 is an ID for uniquely identifying a storage control unit pair assigned to the corresponding logical chunk. The storage node ID (master) 2713 is an ID for uniquely identifying a storage node. The logical chunk ID (master) 2714 is an ID for uniquely identifying a physical chunk. It is possible to uniquely identify a physical chunk assigned to the corresponding logical chunk by combining a storage node ID and a physical chunk ID. The storage node ID (mirror) 2715 and the physical chunk ID (mirror) 2716 are information for identifying a physical chunk redundantized (mirrored) in preparation for a failure. In FIG. 8, a logical chunk having the logical chunk ID 2711 of "0" is assigned to a storage control unit pair "0", a storage node having the storage node ID (master) 2713 of "0" is assigned to a physical chunk having the physical chunk ID 2714 of "0", and a storage node having the storage node ID (mirror) 2715 of "1" is assigned to a physical chunk having the physical chunk ID (mirror) 2176 of "1".

In the example of FIG. 8, a logical chunk table in which data is redundantized by copying (duplicating) a physical chunk is illustrated. In other words, one set of storage control unit pair is assigned to one logical chunk and physical chunks are each assigned to a plurality of storage nodes of a master and a mirror. A structure of a logical chunk management table may be changed based on a method of data redundancy, such as triplication of a physical chunk, application of RAID or erasure coding between storage nodes, or the like.

Figures 9, 10:
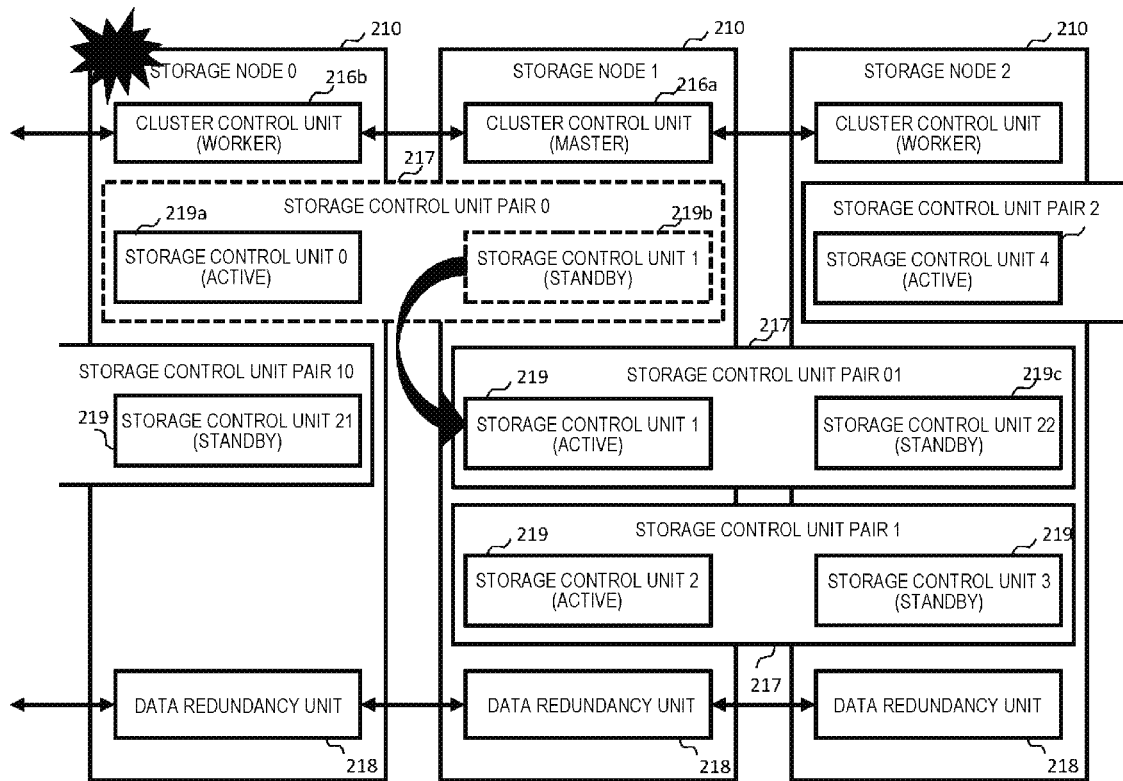
FIG. 9 is a diagram illustrating an example of a physical chunk management table.
FIG. 10 is a diagram for describing the problem to be solved of the invention.

FIG. 9 illustrates an example of a physical chunk management table 272. The physical chunk management table 272 may be represented in a data structure other than a table form. Accordingly, the physical chunk management table 272 may be simply referred to as "information" to indicate that the physical chunk management table 272 does not depend on a data structure. The physical chunk management table 272 manages an address of a storage apparatus corresponding to a physical chunk. The physical chunk management table 272 is stored in a memory of each storage node. The physical chunk management table 272 manages records including a physical chunk ID 2721, a storage apparatus ID 2722, and an offset in storage apparatus 2723. The physical chunk management table 272 may be referred to by the data redundancy unit 218.

The physical chunk ID 2721 is an ID for uniquely identifying a physical chunk. A physical chunk is a resource in a storage node and is a unique ID within the storage node. The storage apparatus ID 2722 is an ID for identifying each storage apparatus in a storage node. The offset in storage apparatus 2723 is an address of a storage apparatus to which a head of a physical chunk identified by a physical chunk ID is assigned. In FIG. 9, a physical chunk having the physical chunk ID 2721 of "0" is stored in a storage apparatus having the storage apparatus ID 2722 of "0", and a head address of the physical chunk is "0x0000" indicated by the offset in storage apparatus 2723.

FIG. 10 is a conceptual diagram for describing the problem to be solved of the invention. FIG. 10 illustrates a case in which a failure has occurred in a "storage node 0" in the configuration of FIG. 3.

The cluster control unit 216a of master role performs alive monitoring on each storage node via regular communication with the cluster control unit 216b of worker role operating in each storage node, or the like.

When a failure of a storage node is detected, first, the occurrence of failure is notified to an administrator of the storage system 200 through the management terminal 110. Subsequently, in order to take over processing of an IO request from a host apparatus with respect to a volume, which was handled by a corresponding storage control unit, the storage control unit 219b in the standby mode that constitutes a pair with the storage control unit 219a in the active mode operating as a corresponding storage node is instructed to switch to an active mode. In FIG. 10, an operation mode of the "storage control unit 1" 219b constituting a pair with the "storage control unit 0" 219a is switched from a standby mode to an active mode.

Next, in order to recover redundancy of the storage control unit pair 217, a storage control unit 219c in a standby mode is reconstructed in a normal storage node. The cluster control unit 216a of master role selects a storage node having a free space for information processing resources, such as a CPU core, memory, or the like, necessary for operating a new storage control unit, and instructs a cluster control unit of the storage node to reconstruct a storage control unit. In the example of FIG. 10, a "storage control unit 22" 219c is reconstructed in a "storage node 2" 210, as a substitute of a "storage control unit 0" that lost functions, and three storage control units are arranged in one storage node. Although not illustrated, a storage control unit that is a substitute of a "storage control unit 21" is also reconstructed.

When there is no storage node having a free space for information processing resources while a reconstruction destination of a storage control unit is selected, the storage control unit cannot be reconstructed, and thus redundancy is unable to be recovered. When information processing resources for reconstructing a storage control unit is pre-reserved in each storage node, recovery of redundancy of a storage control unit may be definitely guaranteed at a time of storage node failure, but in normal times, the reserved information processing resources are unable to be used, and thus a use efficiency of the storage node is decreased and system construction costs increase.

A technology for increasing a use efficiency of a storage node and decreasing system construction costs will be described with reference to FIGS. 11 through 16.

Figure 11:
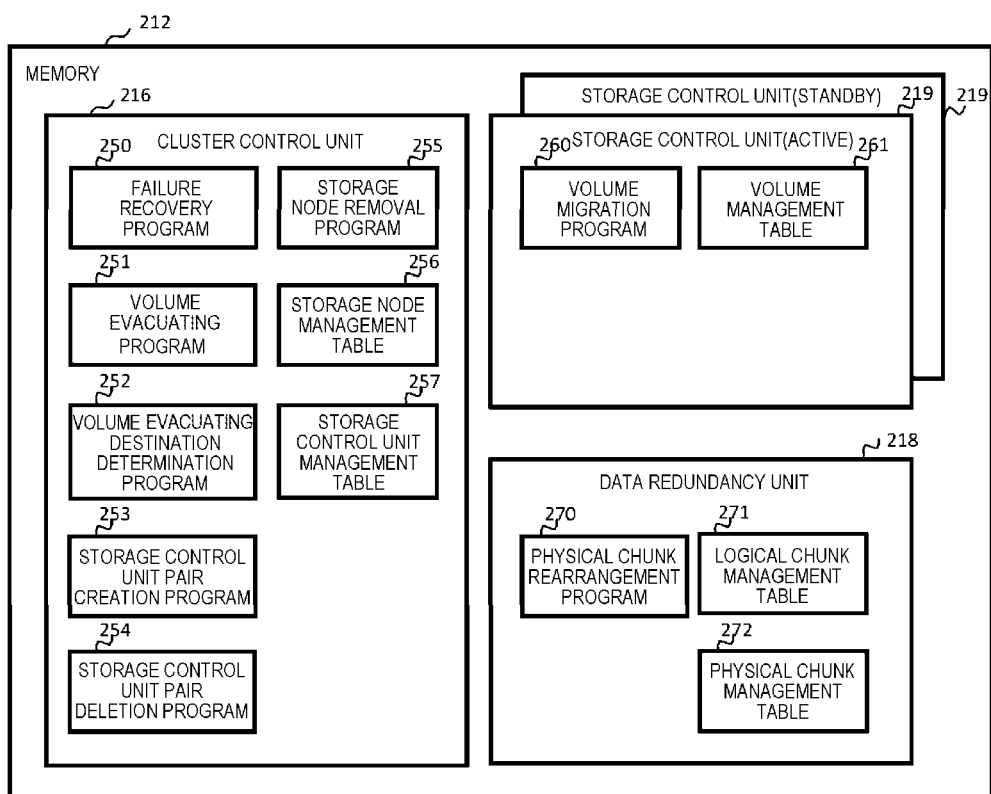
FIG. 11 is a diagram illustrating an example of program and management information stored in a memory.

FIG. 11 illustrates control information (management tables) 256, 257, 261, 271, and 272 and programs 250 to 255, 258, 260, and 270 stored in the memory 212 of a storage node. Other programs or management information may further be stored in an actual memory, but FIG. 11 illustrates those necessary for describing the invention. For example, a program for processing an IO request from a host, a cache management table, and the like are omitted. Here, it is to be noted that a program is also stored in a storage apparatus of each storage node and is loaded to a memory when a storage system is booted or the program is executed. In preparation for a power supply failure or the like, the management tables 256, 257, 261, 271, and 272 may be stored in a storage apparatus and a memory may be used as a cache of a management table stored in the storage apparatus.

A failure recovery program 250, a volume evacuating program 251, a volume evacuating destination determination program 252, a storage control unit pair creation program 253, a storage control unit pair deletion program 254, a storage node removal program 255, and a storage control unit pair reconstruction program 258 are some of programs constituting the cluster control unit 216. The failure recovery program 250, the volume evacuating program 251, the volume evacuating destination determination program 252, the storage node removal program 255, and the storage control unit pair reconstruction program 258 are programs executable when the cluster control unit 216 operates in a master role. The storage control unit pair creation program 253 and the storage control unit pair deletion program 254 are programs executable when the cluster control unit 216 operates in a worker role.

A storage node management table 256 and a storage control unit management table 257 are management information stored in a memory of the cluster control unit 216 of master role. Details of the storage node management table 256 and the storage control unit management table 257 are respectively illustrated in FIGS. 5 and 6. It is assumed that copies of such management table are retained in a cluster control unit of worker role. In this regard, the cluster control unit of worker role may be elevated to a master role and take over processes when a storage node where the cluster control unit 216 of master role is arranged has a failure. In the following description, it is assumed that when such management tables are updated, the copied management tables are simultaneously updated via communication between cluster control units, or the like.

A volume migration program 260 is a part of programs constituting the storage control unit 219. The volume management table 261 is management information stored in a memory of the storage control unit 219, and details thereof are illustrated in FIG. 7. The volume management table 261 is copied between storage control units constituting a storage control unit pair. Accordingly, a storage control unit in a standby mode may take over processes when a storage control unit in an active mode is inoperable due to a storage node failure or the like. In the following description, it is assumed that when the volume management table 261 is updated, a copied management table is simultaneously updated via communication between storage control units, or the like.

A physical chunk rearrangement program 270 is a part of programs constituting the data redundancy unit 218. The logical chunk management table 271 and the physical chunk management table 272 are management information stored in a memory of the data redundancy unit 218. Details of the logical chunk management table 271 and the physical chunk management table 272 are respectively illustrated in FIGS. 8 and 9. In the logical chunk management table 271, a data redundancy unit of each storage node retains records only related to a storage control unit pair arranged in the storage node. In the example of FIG. 8, since a physical chunk is copied to a master and a mirror, one record is copied between data redundancy units of two storage nodes. Since the physical chunk management table 272 is information for managing an address of a storage apparatus in a storage node, there is no need to perform copy or the like.

Figure 12:
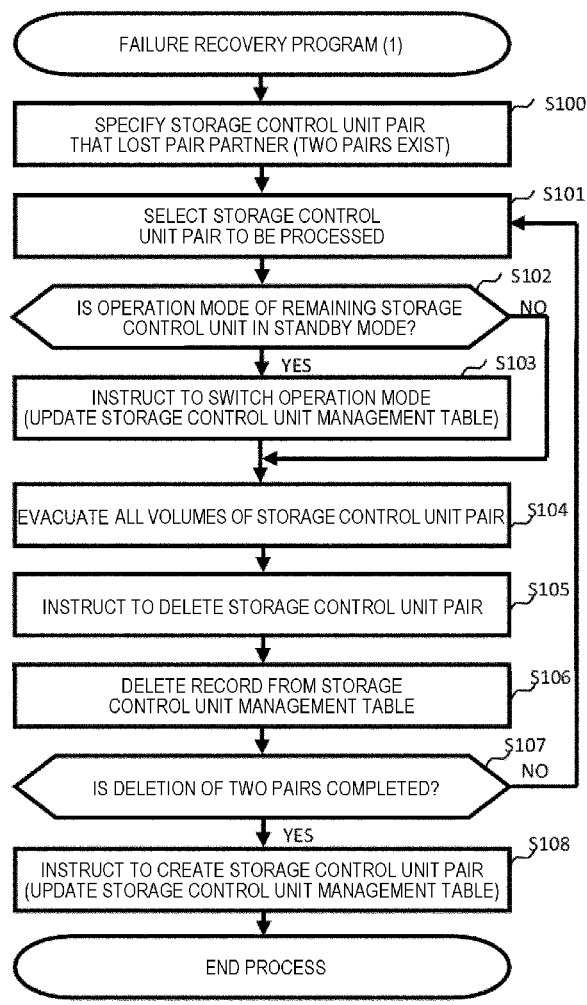
FIG. 12 is a diagram illustrating an example of processes of a failure recovery program (1)
Figure 13:
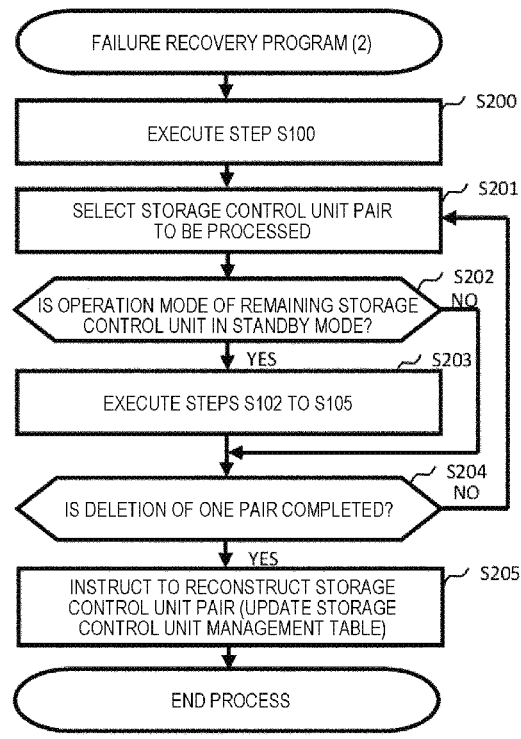
FIG. 13 is a diagram illustrating an example of processes of a failure recovery program (2)

FIGS. 12 and 13 are diagrams each illustrating an example of processes of the failure recovery program 250. Processes of recovering a state in which a storage control unit group whose redundancy has decreased in a storage system due to a storage node failure or the like to a state in which all storage control unit groups maintain redundancy are performed. Hereinafter, for convenience of description, a case in which a storage control unit group is a storage control unit pair including one storage control unit in an active mode and one storage control unit in a standby mode is described. However, the storage control unit group is not limited to a pair, and the basically same processes are performed even when the storage control unit group includes three or more storage control units. When a storage control unit pair or group includes a plurality of storage control units in active modes, a storage control unit in an active mode alive in recovery processes is considered basically the same as a storage control unit in a standby mode.

For example, the failure recovery program 250 performs processes for recovering redundancy of a volume reduced by redundancy reduction of a storage control unit pair due to a storage node failure. Also, the failure recovery program 250 is stored in a memory of the cluster control unit 216 and executed by a CPU of a storage node where the cluster control unit 216 is arranged. The failure recovery program 250 is activated when the cluster control unit 216 operating in the master role detects a failure of a storage node and is executed by the cluster control unit 216. Also, when a failure occurs in a storage node where a cluster control unit of master role is arranged, the failure recovery program 250 is executed by a CPU of a storage node where a cluster control unit of master role newly selected from a cluster control unit of worker role is arranged.

In FIG. 12, when a storage node failure occurs, all storage control unit pairs in which one of storage control units of a storage control unit pair is lost are deleted to use released information processing resources, and a new storage control unit pair is created. According to the example of FIG. 10, since there are two storage control unit pairs of a storage control unit pair 0 and a storage control unit pair 10 in a storage node "0" having a failure, the two storage control unit pairs are deleted and one control unit pair is created.

In FIG. 13, only a storage control unit pair in which a storage control unit in an active mode is deleted from among storage control unit pairs in which one of the pairs is lost to use released information processing resources, and a new pair partner of the storage control unit pair in which a storage control unit in a standby mode is lost is reconstructed. According to an example of FIG. 10, a storage control unit pair 0 in a storage node 0 having a failure, to which the storage control unit 219a in the active mode belongs, is deleted to recover redundancy of one storage control unit pair 10. In other words, by deleting the storage control unit pair 0 (and a storage control unit 1), resources of one storage control unit are released to a storage node 1. By using the released resources, a storage control unit 21 is reconstructed in the storage node 1, and redundancy of the storage control unit pair 10 is recovered.

First, an example of the processes of FIG. 12 will be described. In a failure recovery program (1) of FIG. 12, a storage control unit pair in which one of storage control unit pairs is lost due to a storage node failure is specified (step S100). This process is performed by searching the storage control unit management table 257 for the storage node ID 2573 having a failure and specifying the storage control unit pair ID 2572. At this time, a process of prohibiting new volume creation to the specified storage control unit pair may be added. This process may be performed by adding a column of a volume creation prohibiting flag to the storage control unit management table 257 of FIG. 6 and turning the flag on with respect to the specified storage control unit.

Next, in the failure recovery program (1) 250, a storage control unit pair to be processed is selected from the specified storage control unit pair (step S101). In the first embodiment (FIG. 10), since one storage control unit in an active mode and one storage control unit in a standby mode are arranged in one storage node, there are two storage control unit pairs that lost a pair partner, wherein one of the remaining storage control units operates in an active mode and the other one operates in a standby mode.

The failure recovery program (1) 250 determines whether an operation mode of the remaining storage control unit is a standby mode (step S102), and when the operation mode is not a standby mode, skips step S103 and performs step S104. When the operation mode is a standby mode, the storage control unit is instructed to be switched to an active mode in step S103. Processes related to switching an operation mode are performed as follows. The failure recovery program (1) 250 narrows down a storage control unit ID constituting the storage control unit pair selected in step S101 by searching the storage control unit management table 257 for the storage control unit pair ID selected in step S101. A remaining storage control unit ID may be specified by searching the storage node management table 256 for the narrowed storage control unit ID and specifying a storage control unit ID corresponding to a storage node whose operation state is normal. The operation mode may be obtained by obtaining the operation mode 2574 from the storage control unit management table 257 corresponding to the specified remaining storage control unit ID 2571.

Upon receiving completion of the switching to the active mode from the storage control unit, the failure recovery program (1) updates an operation mode of the storage control unit to "active" in the storage control unit management table 257 (step S103). Alternatively, a storage control unit in a standby mode may monitor an active mode of a pair partner and upon detecting occurrence of a failure, may autonomously switch to an active mode. In this case, step S103 is processes of standing by for the storage control unit in the standby mode to switch to an active mode and updating the storage control unit management table 257 after the completion of the switching. In any case, via step S103, processing of IO request to a volume, which was being executed by the storage control unit in the active mode operating in the storage node having the failure, is taken over by the storage control unit in the standby mode.

Next, the failure recovery program (1) determines whether processes of steps S101 to S103 have been completed for all storage control unit pairs specified in step S100 (step S104). When completed, step S105 is performed and when not completed, the failure recovery program (1) returns to step S101.

Although not illustrated, before step S105 is performed, it may be determined whether free storage capacity of each remaining storage node is sufficient to recover from the storage node failure so as to prevent a failure of failure recovery processes due to insufficient storage capacity. In this case, when it is determined that the free storage capacity is insufficient, free storage capacity insufficiency is notified to the administrator of the storage system 200 via the management terminal 110 and processing of the failure recovery program (1) is ended. Thereafter, the administrator of the storage system 200 takes a countermeasure such as expansion of a storage apparatus or addition of a storage node, and instructs the cluster control unit 216*a* of master role to re-execute the failure recovery program 250 via the management terminal 110.

When a physical chunk is also stored in a storage node in addition to a storage node where a storage control unit is arranged, when a physical chunk is triplicated, or when RAID or erasure coding is applied between storage nodes and a physical chunk is redundantized, redundancy of a logical chunk assigned to a storage control unit pair irrelevant to a lost storage control unit may also be decreased due to a physical chunk lost due to a storage node failure. Accordingly, before performing step S105, the failure recovery program (1) instructs a data redundancy unit of each storage node to determine a decrease of redundancy and recover the redundancy of a logical chunk assigned to a storage control unit pair irrelevant to a lost storage control unit. Upon receiving the instruction, the data redundancy unit performs redundancy recovery processes according to a redundancy scheme.

For example, in the case of a redundancy scheme where a physical chunk is copied (duplicated), the data redundancy unit determines from the logical chunk management table 271 whether a logical chunk storing a physical chunk exists in a storage node having a failure. When the logical chunk exists, it is determined whether the storage control unit pair ID 2712 assigned to the logical chunk is a storage control unit pair including a lost storage control unit. When the storage control unit pair does not include the lost storage control unit, a new physical chunk is obtained, data is copied from an unlost physical chunk constituting the logical chunk to the newly obtained physical chunk, and the assigning of the logical chunk and the physical chunk is updated. When the determining of decrease of redundancy and the recovering of redundancy of the logical chunk are completed for all storage nodes, step S105 is performed.

Then, the failure recovery program (1) selects a storage control unit pair to be processed from the storage control unit pair specified in step S100 (step S105). Subsequently, the failure recovery program (1) executes processes of evacuating all volumes handled by the storage control unit pair in each of a plurality of normal storage control unit pairs not affected by the storage node failure, for each volume (step S106). In other words, all volumes handled by the storage control unit pair are distributed and evacuated in other storage control unit pairs for each volume. Details of volume evacuating processes will be described later with reference to FIGS. 14 and 15. Through such processes, data of all volumes handled by the storage control unit pair is copied to a storage control unit pair of an evacuating destination and thereafter, an IO request from a host apparatus to the volumes is handled by the storage control unit pair of the evacuating destination.

After the evacuating of all volumes is completed, the failure recovery program (1) instructs a cluster control unit of a storage node where the remaining storage control unit operates to delete the storage control unit pair (step S107). Details about deletion processes of a storage control unit pair will be described later with reference to FIG. 16. By deleting the storage control unit pair, information processing resources such as CPU or memory assigned to the storage control unit pair, and memory resources of a logical chunk, physical chunk, and the like are released. After the deleting is completed, the failure recovery program (1) updates the storage control unit management table 257 to delete a record of the storage control unit pair ID 2572 (step S108).

Next, the failure recovery program (1) determines whether the deletion of the storage control unit pair specified in step S100 has been completed (step S109). When completed, step S110 is performed and when not completed, the failure recovery program (1) returns to step S105.

When the deletion of the storage control unit pair that lost one pair partner is completed, the failure recovery program (1) instructs the cluster control unit of the storage node where the remaining storage control unit of the storage control unit pair that lost one pair partner was arranged to create a storage control unit and a storage control unit pair (step S110). Upon receiving the instruction, the cluster control unit (the storage control unit pair creation program 253) secures information processing resources such as a CPU core, a memory, or the like, loads a program constituting a storage control unit from a storage apparatus onto a memory, and activates the storage control unit. The new storage control unit and storage control unit pair are created by using the information processing resources released via the deletion. The failure recovery program (1) updates the storage control unit management table 257 and adds a record after completing the creation of the storage control unit and storage control unit pair.

Details of the storage control unit and the storage control unit pair creation processes by the storage control unit pair creation program 253 are omitted because the processes are the same as those when a storage system is constructed.

Next, an example of processes of FIG. 13 will be described. A failure recovery program (2) 250 of FIG. 13 executes step S100 of FIG. 12 to specify a storage control unit pair that lost one of storage control unit pairs (step S200). Here, processes of prohibiting new volume creation may be added to the specified storage control unit pair. Such processes may be performed by adding a column of a volume creation prohibiting flag to the storage control unit management table 257 of FIG. 6 and turning the flag on with respect to the specified storage control unit.

Subsequently, the failure recovery program (2) executes steps S101 to S104 of FIG. 12 to hand over processing of IO request to a volume, and the like, which was performed by a storage control unit in an active mode operating in a storage node having a failure, to a storage control unit in a standby mode constituting a pair (step S201).

Although not illustrated, before step S202 is performed, it may be determined whether free storage capacity of each remaining storage node is sufficient to recover from the storage node failure so as to prevent a failure of failure recovery processes due to insufficient storage capacity. In this case, when it is determined that the free storage capacity is insufficient, free storage capacity insufficiency is notified to the administrator of the storage system 200 via the management terminal 110 and processing of the failure recovery program (2) is ended. Thereafter, the administrator of the storage system 200 takes a countermeasure such as expansion of a storage apparatus or addition of a storage node, and instructs the cluster control unit 216a of master role to re-execute the failure recovery program 250 via the management terminal 110.

When a physical chunk is also stored in a storage node in addition to a storage node where a storage control unit is arranged, when a physical chunk is triplicated, or when RAID or erasure coding is applied between storage nodes and a physical chunk is redundantized, redundancy of a logical chunk assigned to a storage control unit pair irrelevant to a lost storage control unit may also be decreased due to a physical chunk lost due to a storage node failure. Accordingly, before performing step S202, the failure recovery program (2) instructs a data redundancy unit of each storage node to determine a decrease of redundancy and recover the redundancy of a logical chunk assigned to a storage control unit pair irrelevant to a lost storage control unit. Upon receiving the instruction, the data redundancy unit performs redundancy recovery processes according to a redundancy scheme. For example, in the case of a redundancy scheme where a physical chunk is copied (duplicated), the data redundancy unit determines from the logical chunk management table 271 whether a logical chunk storing a physical chunk exists in a storage node having a failure. When the logical chunk exists, it is determined whether the storage control unit pair ID 2712 assigned to the logical chunk is a storage control unit pair including a lost storage control unit. When the storage control unit pair does not include the lost storage control unit, a new physical chunk is obtained, data is copied from an unlost physical chunk constituting the logical chunk to the newly obtained physical chunk, and the assigning of the logical chunk and the physical chunk is updated. When the determining of decrease of redundancy and the recovering of redundancy of the logical chunk are completed for all storage nodes, step S202 is performed.

Next, the failure recovery program (2) selects a storage control unit pair to be processed (step S202). As illustrated in FIG. 12, according to the example illustrated in FIG. 10, there are two storage control unit pairs that lost a pair partner, wherein one of the remaining storage control units operates in an active mode and the other one operates in a standby mode.

The failure recovery program (2) determines whether an operation mode of the remaining storage control unit is a standby mode (step S203). When the operation mode is not a standby mode, the failure recovery program (2) skips step S204 and performs step S205. When the operation mode is a standby mode, steps S106 to S108 in FIG. 12 are executed in step S204 to evacuate all volumes handled by the storage control unit pair, delete the storage control unit pair, and delete, from the storage control unit management table 257, a record related to the storage control unit pair.

Next, the failure recovery program (2) determines whether the deletion of the storage control unit pair in which the storage control unit in a standby mode remains is completed from among the storage control unit pair specified in step S200 (step S205). When completed, step S206 is performed and when not completed, the failure recovery program (2) returns to step S202.

When the deletion of the storage control unit pair in which the storage control unit in the standby mode remains is completed, the failure recovery program (2) instructs a cluster control unit of the storage node where the remaining storage control unit was arranged (the storage control unit pair reconstruction program 258) to reconstruct a storage control unit pair in which the storage control unit in the active mode remains (step S206).

Upon receiving the instruction, the cluster control unit obtains information processing resources, such as a CPU core, a memory, or the like, loads a program constituting a storage control unit from a storage apparatus onto a memory, and activates the storage control unit. After the activation, the volume management table 261 is copied from the storage control unit in the active mode. The reconstruction of the storage control unit pair is performed by using the information processing resources released via the deletion. After completing the creation of the storage control unit and the storage control unit pair, the failure recovery program (2) updates the storage control unit management table 257 to update information of the storage control unit pair. Since the reconstruction processes are the same as redundancy recovery of a storage control unit pair in the case where the invention is not applied, details thereof are omitted. When the processes of prohibiting new volume creation to the specified storage control unit pair are added in step S200, processes of releasing the prohibition of the new volume creation is added afterward. Such processes may be performed by turning off the added volume creation prohibiting flag in the storage control unit management table 257 of FIG. 6, with respect to the storage control unit of the storage control unit pair specified by the storage control unit pair ID 2572.

In the processes according to FIG. 12, two storage control unit pairs that lost one pair partner sequentially perform volume evacuating, but in practice, the two storage control unit pairs may simultaneously perform volume evacuating. In the processes according to FIG. 13, reconstruction of a storage control unit that is a pair partner of a storage control unit pair in which a storage control unit in an active mode remains is unable to be performed until volume evacuating from a storage control unit pair in which a storage control unit in a standby mode remains and deletion of the storage control unit pair are completed. Accordingly, a time when redundancy of a volume is decreasing is short in the processes according to FIG. 12, and availability is high. Meanwhile, in the processes according to FIG. 12, a newly created storage control unit pair is in charge of no volume immediately after completion of failure recovery processes, and thus use efficiency of information processing resources assigned to a storage control unit is poor.

As such, the two processes in FIGS. 12 and 13 are in a trade-off relationship between availability and use efficiency of information processing resources. In an actual storage system, either one of the two processes schemes of FIGS. 12 and 13 may be provided, or both of the two process schemes may be provided and a cluster control unit may determine which one of the process schemes to perform based on a certain criteria or a process scheme pre-set by administrator of the storage system may be performed. Although the invention has an improved use efficiency of information processing resources by eliminating reserved resources for reconstructing a storage control unit, information processing resources required for failure recovery up to, for example, one storage node may be reserved. In this case, volume evacuating is not performed when up to one storage node has a failure, but reserved information processing resources may be used to reconstruct a storage control unit.

In the processes of FIG. 12, since a newly created storage control unit pair is in charge of no volume immediately after completion of failure recovery processes, in order to increase a use efficiency of information processing resources, the CPU utilization rate 2577 of the storage control unit management table 257 illustrated in FIG. 6, or the like is referred to migrate volumes in charge of a storage control unit and storage control unit pair having high loads to the newly created storage control unit pair, thereby performing processes aiming at distribution of overall system loads.

Meantime, when free storage capacity of an entire storage system is insufficient, it is common to resolve storage capacity insufficiency by adding a new storage node in SDS. In this case, the storage capacity insufficiency is resolved by assigning a physical chunk of the newly added storage node to a logical chunk. Meanwhile, there may be erasure coding having a characteristic (read locality) in that a read process may be performed without having to access a physical chunk of another storage node. In a storage system to which erasure coding having read locality is applied, when a new storage node is added and a physical chunk of the new storage node is assigned to a logical chunk to resolve storage capacity inefficiency, a feature of read locality may be lost. Thus, by migrating a volume to a storage control unit pair newly created in the newly added storage node as in a case of migrating a volume to a newly created storage control unit pair after failure recovery processes, free storage capacity insufficiency may be resolved without losing the feature of erasure coding having read locality.

Figure 14:
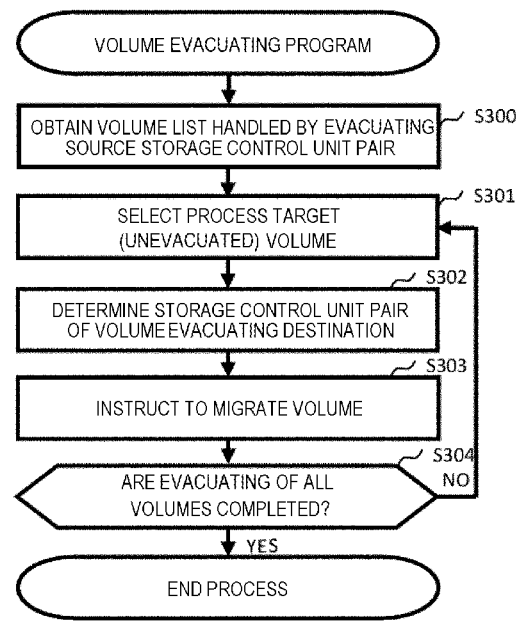
FIG. 14 is a diagram illustrating an example of processes of a volume evacuating program (1)

FIG. 14 is a diagram illustrating an example of processes of the volume evacuating program 251. The volume evacuating program 251 performs processes of evacuating all volumes handled by a storage control unit pair that lost one of pair partners due to a storage node failure, in a normal storage control unit pair whose redundancy is not decreased, the processes being instructed by the failure recovery program 250. In other words, the all volumes handled by the storage control unit pair that lost one pair partner are distributed and evacuated in a plurality of normal storage control unit pairs whose redundancy is not decreased. The volume evacuating program 251 is stored in a memory of the cluster control unit 216 and executed by a CPU of a storage node where the cluster control unit 216 is arranged. The volume evacuating program 251 is activated from the failure recovery program 250 executed by the cluster control unit 216 of master role, and the cluster control unit is executed. When a cluster control unit of master role does not operate due to a failure, another cluster control unit of a worker role in a cluster may switch to a master role and be executed.

The volume evacuating program 251 obtains a volume list handled by an evacuating source storage control unit pair specified by the failure recovery program 250 (step S300). In other words, information about all volumes handled by a storage control unit pair that lost one pair partner is obtained. As described above, the volume management table 261 is information existing in a memory of a storage control unit. Thus, in practice, the information is obtained through a cluster control unit of a storage node where a remaining storage control unit of the storage control unit pair is arranged. The volume evacuating program 251 receives the volume management table 261 from the remaining storage control unit of the storage control unit pair through the cluster control unit of the storage node where the remaining storage control unit is arranged, and obtains all volume IDs 2611 corresponding to the storage control unit pair ID 2614.

Next, the volume evacuating program. 251 selects unsaved volumes one by one from all volumes corresponding to the obtained storage control unit pair ID 2614 (step S301), and performs volume evacuating destination determination processes on each of the selected volumes to determine a storage control unit pair of a volume evacuating destination (step S302). Details about the volume evacuating destination determination processes will be described later with reference to FIG. 15.

After the evacuating destination of the volume is determined, the volume evacuating program 251 instructs the storage control unit of the evacuating source and the storage control unit of the evacuating destination to migrate the volume (step S303). Since such volume migration processes are generally the same as technology and function referred to as volume migration or the like, details thereof are omitted. When the evacuating of volume is completed, the volume evacuating program 251 determines whether evacuating of all the volumes specified in step S300 is completed (step S304). When the evacuating of all volumes is completed, the process by the volume evacuating program 251 is ended. On the other hand, when the evacuating of all volumes is not completed, the volume evacuating program 251 returns to step S301 and executes steps S302 to S304 on another volume.

In the example of FIG. 14, the volumes are evacuated one by one while standing by for migration completion, but evacuating of a next volume may be started without standing by for migration completion to evacuate the plurality of volumes concurrently. However, in this case, effects of volumes that are currently concurrently evacuated need to be considered while determining the storage control unit pair of the evacuating destination.

Also, during volume creation, ranking, such as gold (high rank), silver (middle rank), and bronze (low rank), may be performed on each volume such that an order of performing the volume migration is changed based on ranks. Likewise, a processing speed of the volume migration may be changed based on the ranks of volumes. For example, a volume is migrated first as a rank thereof is high and by speeding up a processing speed, a period during which redundancy of the volume having the high rank is decreased is reduced. Such processes may be realized by adding a column indicating a rank of a volume to the volume management table 261 of FIG. 7 and referring to the column when a volume to be migrated is selected in step S301 or when volume migration is instructed in step S303.

In the example of FIG. 14, an evacuating destination storage control unit pair is determined independently for each volume, but one evacuating destination storage control unit pair may be determined for a plurality of volumes having dependency like volumes created from a snapshot of a certain volume. In a storage system having a deduplication function for removing data that is redundant between a plurality of volumes, one evacuating destination storage control unit pair may be determined for a plurality of volumes having a high data redundancy degree.

Figure 15:
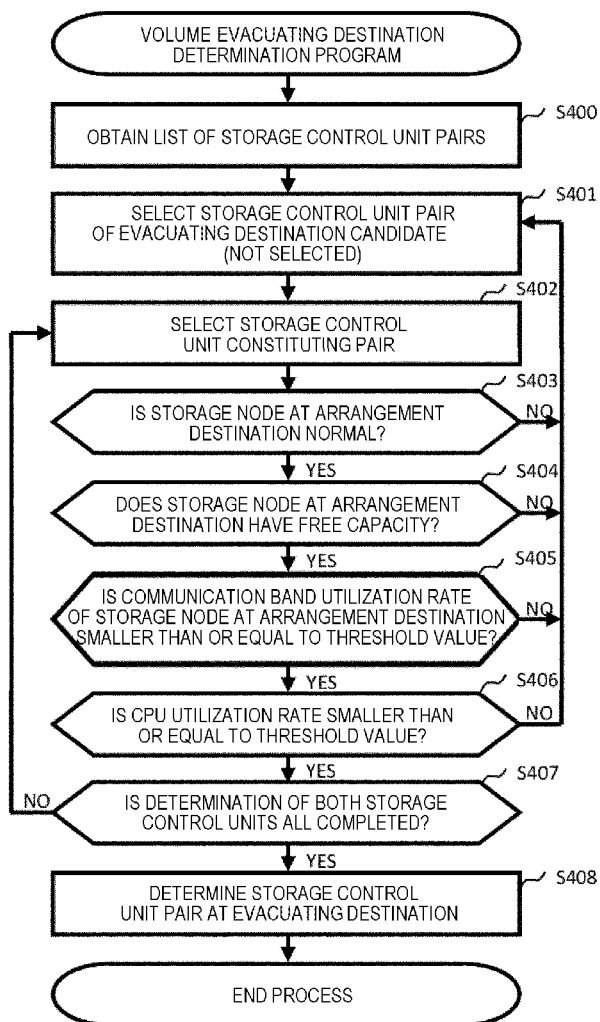
FIG. 15 is a diagram illustrating an example of processes of a volume evacuating destination determination program (1)

FIG. 15 illustrates an example of processes of the volume evacuating destination determination program 252. The volume evacuating destination determination program 252 performs processes of determining an optimum storage control unit pair as an evacuate destination of a volume, which are instructed from the volume evacuating program 251. In other words, the processes illustrated in FIG. 15 are performed for each volume, with respect to all volumes handled by a storage control unit pair that lost one pair partner. The volume evacuating destination determination program 252 is stored in a memory of the cluster control unit 216 of master role and executed by a CPU of a storage node where the cluster control unit 216 is arranged. The volume evacuating destination determination program 252 is activated by a volume evacuating program executed by a cluster control unit of master role and is executed by the cluster control unit 216. When a cluster control unit of master role does not function due to a failure, another cluster control unit of a worker role in a cluster switches to a master role to be operated.

The volume evacuating destination determination program 252 obtains a list of storage control unit pairs to be evacuating destination candidates by referring to the storage control unit management table 257 (step S400). In other words, all pieces of information of the storage control unit pair ID 2572 of the storage control unit management table 257 are obtained.

Storage control unit pairs to be processed are selected one by one from the obtained list of storage control unit pairs (step S401), and storage control units to be processed are selected one by one from storage control units constituting the storage control unit pair (step S402). The volume evacuating destination determination program 252 determines whether an operation status of a storage node where the storage control unit is arranged is normal (step S403). When the operation status is not normal, the processes return to step S401 and steps S402 to S407 are performed on another storage control unit pair.

When the operation status is normal, it is determined whether free capacity of a storage apparatus of the storage node where the storage control unit is arranged is equal to or greater than a threshold value when the volume is evacuated in the storage node where the storage control unit is arranged (step S404). When the free capacity is smaller than the threshold value, the processes return to step S401 and steps S402 to S407 are performed on another storage control unit pair.

When the free capacity is equal to or greater than the threshold value, it is determined whether a communication band utilization rate of the storage node where the storage control unit is arranged is smaller than or equal to a threshold value (step S405). When the communication band utilization rate is greater than the threshold value, the processes return to step S401 and steps S402 to S407 are performed on another storage control unit pair.

When the communication band utilization rate is smaller than or equal to the threshold value, it is determined whether a CPU utilization rate of the storage control unit is smaller than or equal to a predetermined threshold value, by referring to a storage control unit management table (step S406). When the CPU utilization rate is greater than the threshold value, the processes return to step S401 and steps S402 to S407 are performed on another storage control unit pair. When the CPU utilization rate is smaller than or equal to the threshold value, step S407 is performed.

The operation status of the storage node where the storage control unit is arranged, the storage node determined in the volume evacuating destination determination program 252 in step S403, may be obtained from the operation status 2563 of the storage node management table 256 corresponding to the storage node ID 2573 by obtaining the storage node ID 2573 corresponding to the storage control unit ID 2571 selected from the storage control unit management table 257 in step S402.

The free capacity of the storage node after the volume evacuating, which is determined in step S404 may be obtained by subtracting the total storage apparatus usage 2568 from the total storage apparatus capacity 2567 corresponding to the storage node ID 2561 of the storage node management table 256 and also subtracting the used capacity 2613 corresponding to the volume ID 2611 of the volume management table 261.

The communication band utilization rate of the storage node determined in step S405 may be obtained from the operation status 2563 and the communication band utilization rate 2566 of the storage node management table 256 corresponding to the storage node ID 2573 by obtaining the storage node ID 2573 corresponding to the storage control unit ID 2571 selected from the storage control unit management table 257 in step S402.

The CPU utilization rate of the storage control unit determined in the volume evacuating destination determination program 252 in step S406 may be obtained from the CPU utilization rate 2577 of the storage control unit management table 257 corresponding to the storage control unit ID selected in step S402.

The threshold values used in the determination in steps S404 to S406 may be fixed values throughout the storage system or may be values set for each storage node. When the threshold values are settable for each storage node, a column of each threshold value is added to a storage node management table and obtained whenever the volume evacuating destination determination program performs steps S404 to S406.

When a physical chunk is stored also in another storage node in addition to the storage node where the storage control unit is arranged, step S404 may be skipped uniformly and step S405 may be performed.

The volume evacuating destination determination program 252 determines whether steps S403 to S406 are completed for all the storage control units constituting the storage control unit pairs (step S407). When steps S403 to S406 are completed, the storage control unit pair is determined as an evacuating destination (step S408). When there is a storage control unit that has not been completed, the processes return to step S402 and steps S403 to S407 are performed.

The determination processes of FIG. 15 are only an example, and arbitrary determination processes may be performed according to an actual structure or characteristics of the storage system, or the like. For example, the determination in steps S403 to S406 may be determined by executing at least one step in accordance with the characteristics of the storage system required as the evacuating destination. Further, the determination may be determined according to a distance on a network between a host apparatus using the volume and the storage node where the storage control unit of an evacuating destination candidate is arranged, according to a communication band utilization rate of a network switch existing on a communication path via a network, or the like. Further, in the storage system having a deduplication function, when there is a restriction that deduplication is applicable only between volumes in the same storage control unit pair, a data reduction amount according to the deduplication function varies depending on the evacuating destination of the volume. In this case, the volume may be evacuated in a storage control unit pair having the largest reduction amount by roughly pre-estimating a data amount reduced by the deduplication function when the volume is evacuated in the storage control unit pair of the evacuating destination candidate. Further, the threshold values of the communication band utilization rate of step S405 and the CPU utilization rate of step S406 may be changed according to an IO amount of the volume to be evacuated, by using an IO amount managed in the volume management table 261 (FIG. 7). Further, by adding information such as an operating frequency of a CPU mounted on a storage node, a type or IO performance of each storage apparatus mounted thereon, and the like to the storage node management table 256 of FIG. 5, and selecting, as an evacuating destination, a storage control unit arranged on a storage node where a component equal to or more than a CPU and a storage apparatus mounted on a storage node having a failure are mounted, IO performance equivalent to that before evacuating of a volume may be obtained even after the evacuating.

Figure 16:
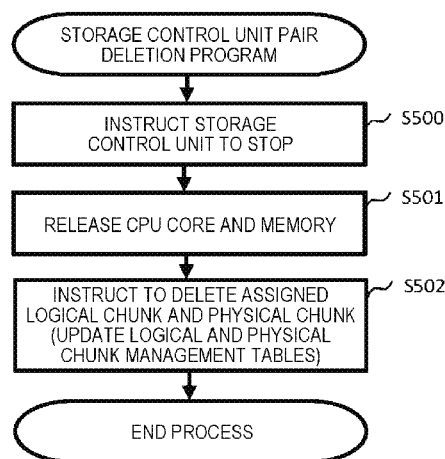
FIG. 16 is a diagram illustrating an example of processes of a storage control unit pair deletion program (1)

FIG. 16 illustrates an example of processes of the storage control unit pair deletion program 254. The storage control unit pair deletion program 254 performs processes of deleting a storage control unit instructed from the failure recovery program 250. The storage control unit pair deletion program 254 is stored in the memory 212 of the cluster control unit 216 and is executed by a CPU of a storage node where the cluster control unit is arranged. The storage control unit pair deletion program 254 is activated from the failure recovery program 250 executed by a cluster control unit of master role and is executed by a cluster control unit of a storage node where a remaining storage control unit of a storage control unit pair that lost one pair partner and that is a deletion target is operated.

The storage control unit pair deletion program 254 instructs the remaining storage control unit of the storage control unit pair of the deletion target operating in the storage node to stop (step S500).

When the storage control unit is stopped, information processing resources such as a CPU core, memory, or the like assigned to the storage control unit are released (step S501). Although the released information processing resources are used to create a new storage control unit after the storage control unit pair deletion program 254 is executed, the information processing resources may not be actually released but information processing resources scheduled to be realized may be reused when the new storage control unit is created. Next, the storage control unit pair deletion program 254 instructs the data redundancy unit 218 operating in the storage node to delete a logical chunk assigned to the storage control unit pair and a physical chunk assigned to the logical chunk (step S502). The data redundancy unit 218 deletes the instructed logical chunk and physical chunk, and deletes related records from the logical chunk management table 271 and the physical chunk management table 272.

According to the first embodiment as such, by distributing and evacuating a plurality of volumes that were processed by a storage control unit having decreased redundancy in a normal storage control unit without recovering the decreased redundancy of the storage control unit and deleting the storage control unit having the decreased redundancy itself after the evacuating is completed, reservation information processing resources for guaranteeing recoverability of the redundancy are not required, and thus a use efficiency of a physical server is improved.

Also, when a failure occurs in a storage node constituting a storage system, control information (various management tables) managed by the storage node and data stored in a physical chunk may be taken over by a normal storage node without having to secure spare resources. Even after processes are handed over to the normal storage node, high responsiveness may be maintained with respect to an IO request from a host apparatus by managing correspondence between a storage control unit and a volume and storing data in a storage node where the storage control unit is arranged (securing locality of the data). In other words, when there is a read request of data with respect to a storage apparatus providing a volume to the host apparatus, it is not necessary to read data from another storage node.

Also, since it is not necessary to secure spare resources, it is possible to reduce construction costs of the storage system and efficiently cope with cost reduction required in SDS using the virtualization technology. In addition, compared with a conventional technology in which spare resources are secured, the number of CPU cores or memory capacity required to realize the same level of availability may be reduced by about ⅔. Accordingly, it is possible to reduce the construction costs of the storage system by 20%.

Second Embodiment

Hereinafter, a second embodiment will be described with reference to FIG. 17.

In the first embodiment, a recovery method when a storage node failure is occurred is described. In the second embodiment, a technology applied to storage node removal will be described. In other words, processes of removing a storage node from a storage system are performed. Hereinafter, for convenience of description, a storage control unit group will be described in a case of a storage control unit pair constituting one storage control unit in an active mode and one storage control unit in a standby mode. However, the same processes are performed basically not only on the pair but also on a storage control unit group constituting three or more storage control units. When the storage control unit pair or group includes a plurality of storage control units in active modes, the storage control unit in the active mode may be treated basically the same as the storage control unit in the standby mode during removal processes.

FIG. 17 illustrates an example of processes of the storage node removal program 255. The storage node removal program 255 performs processes for removing a storage node assigned by an administrator of the storage system from the storage system. The storage node removal program 255 is activated by an instruction of the administrator of the storage system 200 via the management terminal 110 and executed by a CPU of a storage node where a cluster control unit of master role is arranged. When the cluster control unit 216 of master role detects a sign of the storage node failure via monitoring processes of each storage node performed periodically, the storage node removal program 255 may be activated to prevent a redundancy reduction from occurring due to the storage node failure. Although not illustrated, when the cluster control unit 216 arranged in the storage node of a removal target is a master role, any cluster control unit of a worker role arranged in another storage node is pre-switched to a master role.

The storage node removal program 255 is executed by a CPU of a storage node where the cluster control unit newly switched to the master role is arranged. A method of selecting a cluster control unit to be switched to a master role may be the same as that performed when a cluster control unit of a master role is lost due to a storage node failure.

In addition, the cluster control unit of master role arranged in the storage node of the removal target may select the new cluster control unit of master role via some determination processes. Before starting processes, the storage node removal program 255 compares total free capacity of a storage apparatus of all storage nodes constituting the storage system excluding the storage node of the removal target with total usage of a storage apparatus of the storage node of the removal target, and stops the processes when it is determined that capacity of the storage apparatus is insufficient during storage node removal. During the removal processes, processes of preventing capacity insufficiency during the storage node removal may be added.

When an instruction to create a volume is received from the administrator of the storage system during execution of the storage node removal program 255, processes of determining whether there is a possibility that free capacity insufficiency may occur, and when it is determined that the possibility is high, stopping volume creation to prevent capacity insufficiency during the storage node removal may be added.

The storage node removal program 255 selects the storage control unit pair 217 included in the storage control unit 219 arranged in the storage node of the removal target (step S600). Step S600 is performed by specifying a storage control unit pair ID by searching the storage control unit management table 257 for the storage node ID 2573 of the removal target. Here, processes of prohibiting new volume creation in the specified storage control unit pair may be added. Such processes may be realized by adding a column of a volume creation prohibiting flag to the storage control unit management table 257 of FIG. 6 and turning the flag on with respect to a storage control unit of the storage control unit pair specified by the storage control unit pair ID 2572. As illustrated in FIGS. 12 and 13, according to the example illustrated in FIG. 10, there are two storage control unit pairs including storage control units arranged in the storage node of the removal target, wherein one of the storage control units arranged in the storage node of the removal target is operated in an active mode and the other is operated in a standby mode.

When a physical chunk is also stored in a storage node in addition to the storage node where the storage control unit 219 is arranged, when the physical chunk is triplicated, or when RAID or erasure coding is applied between storage nodes and a physical chunk is redundantized, it is likely that a physical chunk constituting a logical chunk assigned to a storage control unit pair other than the storage control unit pair specified in step S600 is stored in the storage node of the removal target. Thus, before step S601 is performed, the storage node removal program 255 instructs a data redundancy unit of all storage nodes excluding the removal target to determine whether a physical chunk constituting a logical chunk assigned to a storage control unit pair irrelevant to the storage control unit arranged in the storage node of the removal target is arranged in the storage node of the removal target, and to rearrange the physical chunk in another storage node.

Upon receiving the instruction, the data redundancy unit performs determining and rearranging of an arrangement destination of the physical chunk according to a redundancy scheme. For example, in the case of a redundancy scheme of copying (duplicating) the physical chunk, the data redundancy unit determines whether a logical chunk storing the physical chunk exists in the storage node of the removal target from the logical chunk management table 271. When the logical chunk exists, it is determined whether the storage control unit pair ID 2712 assigned to the logical chunk is a storage control unit pair including the storage control unit arranged in the storage node of the removal target. When the storage control unit pair is not a storage control unit pair including a lost storage control unit, a new physical chunk is obtained and data is copied from one of physical chunks constituting the logical chunk to the obtained new physical chunk. After completion of the copying, the logical chunk management table 271 is updated to change the physical chunk stored in the storage node of the removal target among the physical chunks constituting the logical chunk to the physical chunk at the copied destination.

When determination and rearrangement of the arrangement destination of the physical chunk are completed for all storage nodes excluding the removal target, step S601 is performed.

The storage node removal program 255 selects a storage control unit pair to be processed from the specified storage control unit pairs (step S601). It is determined whether a storage control unit in an active mode of the storage control unit pair is arranged in the storage node of the removal target (step S602).

When the storage control unit in the active mode is arranged, steps S106 to S108 of FIG. 12 are performed to evacuate all volumes handled by the storage control unit pair and delete the storage control unit pair (S603). Accordingly, information processing resources required to arrange one storage control unit are released in the storage node where a storage control unit in a standby mode of the storage control unit pair was arranged. When the storage control unit in the active mode is not arranged, step S603 is skipped and step S604 is performed. Processes of step S602 are performed by obtaining the operation mode 2574 of a storage control unit obtained by searching the storage control unit management table 257 for the storage node ID 2573 of the removal target and the storage control unit pair ID 2572 selected in step S601 in an AND condition.

The storage node removal program. 255 determines whether deletion of storage control unit pair where the storage control unit in the active mode is arranged is all completed in the storage node of the removal target (step S604). When the deletion is completed, step S605 is performed and when not completed, step S601 is performed.

Next, the storage node removal program 255 instructs the cluster control unit 216 of a storage node that is not the removal target constituting the deleted storage control unit pair to copy the storage control unit in the standby mode of the storage control unit pair remaining in the storage node of the removal target (step S605). Reasons for copying the storage control unit in the standby mode instead of reconstructing the storage control unit in the active mode of the storage control unit pair are to minimize effects on IO processes of a volume processed by the storage control unit of the active mode.

Upon receiving the instruction, the cluster control unit 216 obtains information processing resources, such as a CPU core, a memory, or the like, loads a program constituting a storage control unit onto the memory from a storage apparatus, and activates the storage control unit. The obtained information processing resources are those released by the deletion. A volume management table is copied from the storage control unit of the storage control unit pair in the standby mode remaining in the storage node of the removal target after the activation.

After completing the copying of the storage control unit 219, the storage node removal program 255 instructs the data redundancy unit of the storage node that is not the removal target constituting the deleted storage control unit pair, to rearrange a physical chunk constituting a logical chunk assigned to the storage control unit pair to be processed of step S605 (step S606). Upon receiving the instruction, the data redundancy unit copies records matched to the storage control unit pair ID 2712 from records of the logical chunk management table 271 of the data redundancy unit of the storage control unit of the removal target.

Thereafter, the data redundancy unit 218 obtains a new physical chunk and copies data of the physical chunk stored in the storage control unit of the removal target. The logical chunk management table is updated and the physical chunk stored in the storage node of the removal target among the physical chunks constituting the logical chunk is changed to the copied physical chunk.

When the rearranging of the physical chunk is completed, the storage node removal program 255 instructs to switch to the storage control unit obtained by copying the storage control unit in the standby mode of the storage control unit pair, and updates the storage control unit management table 257 (step S607). When the processes of prohibiting new volume creation to the specified storage control unit pair are added in step S600, processes of releasing the prohibition of the new volume creation are added in step S600. Such processes may be realized by turning off the added volume creation prohibiting flag in the storage control unit management table 257 of FIG. 6 with respect to the storage control unit of the storage control unit pair specified by the storage control unit pair ID 2572.

Next, the storage node removal program 255 instructs a cluster control unit and a data redundancy unit operating in the storage node of the removal target to stop (step S608), and deletes records related to the storage node from the storage node management table 256 (step S609). When the above processes are completed, the storage node of the removal target is completely disconnected from the storage system and the storage node may be physically removed.

As such, according to the second embodiment, by distributing and evacuating a plurality of volumes that were handled by a storage control unit operating in a storage node of a removal target, in a storage control unit other than the removal target, and deleting the storage control unit operating in the storage node of the removal target after completion of the evacuating, reservation spare information processing resources for removing the storage node are not required, and thus a use efficiency of a physical server is improved.

Even after processes of an IO request with respect to a volume, which were handled by the storage control unit operating in the storage node of the removal target, are handed over to another storage control unit, high responsiveness may be maintained with respect to the IO request from a host apparatus by storing data in a storage node where the storage control unit is arranged (securing locality of the data). In other words, when there is a read request of data with respect to a storage apparatus providing a volume to the host apparatus, it is not necessary to read data from another storage node.

It is not necessary to secure spare resources for removing the storage node, and it is possible to improve scalability required for SDS using a virtualization technology since it is possible to scale a storage system.

As described above, in the first embodiment, a volume is evacuated from a storage control unit pair constituted by using a storage control unit of a storage node having a failure, but in the second embodiment, a storage node in a storage control unit is removed.

In the invention, furthermore, a storage node may continue to operate without a failure or removal, and a storage control unit pair that is in charge of and changes a volume may continue to operate while leaving the assigned volume. Also, volume responsibilities are distributed and moved from one storage control unit pair to a plurality of storage control unit pairs, but alternatively, the volume responsibilities may move from one storage control unit pair to one storage control unit pair, from a plurality of storage control unit pair to one storage control unit pair, or from a plurality of storage control unit pair to a plurality of storage control unit pair.

What is claimed is:

1. A storage system comprising a plurality of storage nodes constituting a cluster,
a storage apparatus storing data,
a cluster control unit controlling the storage system, and
a storage control unit, in a storage node of the plurality of storage nodes, providing a storage area in units of volume to a host apparatus by using the storage apparatus and storing data in the storage apparatus in response to an input/output (I/O) request from the host apparatus,
the storage control unit in the storage node is configured to constitute a first storage control unit group with a storage control unit of another storage node in the cluster,
wherein a storage control unit of the first storage control unit group processes the I/O request from the host apparatus as a storage control unit in an active mode and another storage control unit of the first storage control unit group takes over processes of the storage control unit in the active mode, and
wherein the cluster control unit obtains information about a volume handled by the first storage control unit group, determines a second storage control unit group with respect to the volume about which the information is obtained, and migrates the volume handled by the first storage control unit group from a storage control unit within the first storage control unit group to a storage control unit of the second storage control unit group.

2. The storage system according to claim 1, wherein the storage system is configured to delete the first storage control unit group, after the volume has been migrated.

3. The storage system according to claim 2, wherein a migration of the volume is performed when a number of operating nodes decreases due to a reduction or a failure.

4. The storage system according to claim 3, wherein the migration of the volume is performed when a storage node including the volume is to be removed,
the storage system is configured to migrate the volume of the first storage control unit group in which the active mode storage control unit is placed on the storage node to be removed to the second storage control unit group.

5. The storage system according to claim 4, wherein the storage system is configured to, migrate the volume of the first storage control unit group to another node, activate a standby mode storage control unit-of the first storage control unit group, when a standby mode storage control unit which is able to take over a processing of an active mode storage control unit in the first storage control unit group is placed on the node to be removed.

6. The storage system according to claim 3, wherein the migration of volume is performed when the storage node to be removed is to be removed because of a failure,
the first storage control unit group in which the active mode storage control unit is placed on the node to be removed, switches storage control units located on other nodes to the active mode.

7. The storage system according to claim 6, wherein the first storage control unit group is placed on the node to be removed, includes the volume, a storage control unit group is configured by copying the volume to a node where a storage control unit of the deleted first storage control unit group is placed and no failure has occurred, and the storage control unit of the deleted first storage control unit group is activated.

8. In a storage system having a plurality of storage nodes constituting a cluster, a storage apparatus storing data, a cluster control unit controlling the storage system, and a storage control unit, in a storage node of the plurality of storage nodes, providing a storage area in units of volume to a host apparatus by using the storage apparatus and storing data in the storage apparatus in response to an input/output (I/O) request from the host apparatus, wherein the first storage control unit in the storage node is configured to constitute a storage control unit group with a storage control unit of another storage node in the cluster, a method comprising the steps of:
processing, by a storage control unit of the first storage control unit group, the I/O request from the host apparatus as a storage control unit in an active mode;
taking over processing, by another first storage control unit of the storage control unit group, of the storage control unit in the active mode, and
obtaining, by the cluster control unit, information about a volume handled by the first storage control unit group, determining a second storage control unit group with respect to the volume about which the information is obtained, and migrating the volume handled by the first storage control unit group from a storage control unit within the first storage control unit group to a storage control unit of the second storage control unit group.

9. The method according to claim 8, further comprising the step of:
deleting the first storage control unit group, after the volume has been migrated.

10. The method according to claim 9, further comprising the step of:
performing migration of the volume when a number of operating nodes decreases due to a reduction or a failure.

11. The method according to claim 10, further comprising the steps of:
performing migration of the volume when a storage node including the volume is to be removed,
migrating the volume of the first storage control unit group in which the active mode storage control unit is placed on the storage node to be removed to the second storage control unit group.

12. The method according to claim 10, further comprising the steps of:
migrating the volume of the first storage control unit group to another node; and
activating a standby mode storage control unit of the standby mode of the first storage control unit group, when a standby mode storage control unit which is able to take over a processing of an active mode storage control unit in the first storage control unit group is placed on the node to be removed.

13. The method according to claim 10, further comprising the steps of:
performing migration of volume when the storage node to be removed is to be removed because of a failure; and
switching, by the first storage control unit group in which the active storage control unit is placed on the node to be removed, storage control units located on other nodes to the active mode.

14. The method according to claim 13, wherein the first storage control unit group is placed on the node to be removed, includes the volume, a storage control unit group is configured by copying the volume to a node where a storage control unit of the deleted first storage control unit group is placed and no failure has occurred, and the storage control unit of the deleted first storage control unit group is activated.

* * * * *